United States Patent [19]

Corwin, Jr. et al.

[11] 3,920,972

[45] Nov. 18, 1975

[54] METHOD AND APPARATUS FOR PROGRAMMING A COMPUTER OPERATED ROBOT ARM

[75] Inventors: Merton Dudley Corwin, Jr.; Richard Edward Hohn; Ronald Lee Tarvin, all of Cincinnati, Ohio

[73] Assignee: Cincinnati Milacron Inc., Cincinnati, Ohio

[22] Filed: July 16, 1974

[21] Appl. No.: 488,968

[52] U.S. Cl. ............................... 235/151.11; 444/1
[51] Int. Cl.² ....................... B25J 9/00; G06F 15/46
[58] Field of Search ..... 235/151.11; 214/1 CM, 1 B; 198/29, 34; 318/574

[56] References Cited
UNITED STATES PATENTS 3,543,910  12/1970  Devol et al. ............................ 198/34
3,661,051  5/1972  Dunne et al. ............................ 91/35

OTHER PUBLICATIONS

"Controlling a Remote Manipulator with the Aid of a Small Computer," by Beckett et al., an ASME Publication 70DE13, 12-1969.
"The Mathematics of Coordinated Control of Prosthetic Arms and Manipulators" by D. E. Whitney, an ASME Publication, 72WA/AUT-4, 8-1972.

Primary Examiner—Eugene G. Botz
Attorney, Agent, or Firm—C. Richard Eby

[57] ABSTRACT

A method and apparatus is disclosed for teaching a cycle of operation to a computer operated robot arm thereby permitting the arm to automatically iterate the cycle of operation. The disclosed apparatus is operable with a robot arm having a geometric configuration defining a generalized coordinate system. By means of manually operable controls, a controlled element attached to one end of the arm is commanded to move to a number of predetermined points defining a desired path in space. This commanded motion is executed relative to a teaching coordinate system; e.g., a rectangular coordinate system which is noncoincident with the generalized coordinate system of the robot arm. When the controlled element is positioned at a predetermined point, further manual controls are operable to generate input signals defining a robot arm operation to be executed at said point. Next, the input signals and the coordinate information defining the predetermined point are transferred to a memory. After a complete cycle of operation has been transferred to the memory, the robot arm operation may be transferred to an automatic mode which causes the arm to automatically repeat the programmed cycle of operation.

45 Claims, 23 Drawing Figures

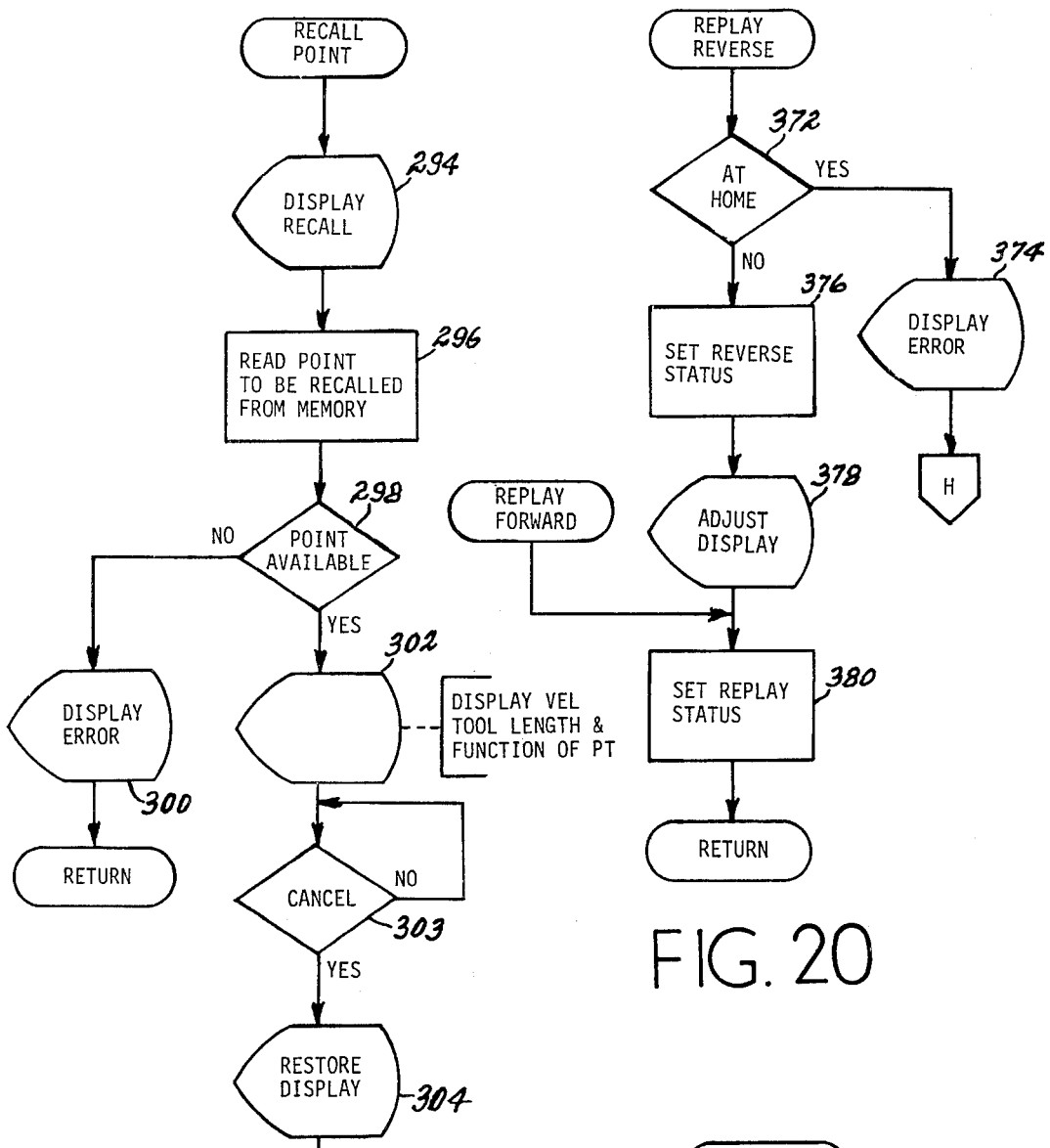
FIG. 19
FIG. 20
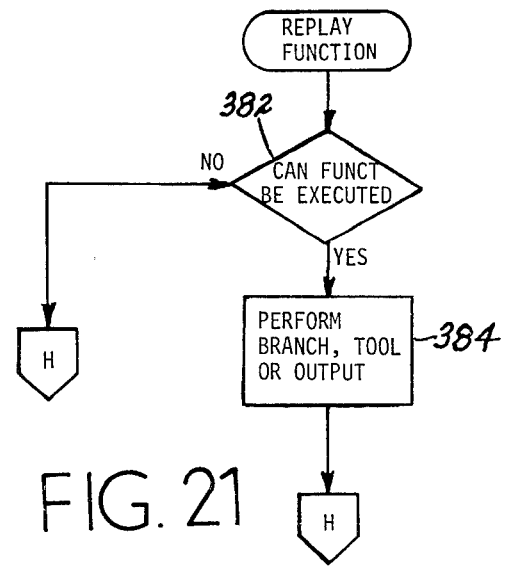
FIG. 21

METHOD AND APPARATUS FOR PROGRAMMING A COMPUTER OPERATED ROBOT ARM

BACKGROUND OF THE INVENTION

The present invention relates generally to the area of computer operated robot arms; and specifically, the invention provides a unique method and apparatus for programming a cycle of operation. A robot arm is generally applied by integrating the operation of a function element attached to the arm into some physical process. The operation of the robot arm may be synchronized in time with the operation of the process. Alternatively, the robot arm operation may be initiated in response to signals generated by the process; and thereafter, the robot arm may send signals back to the physical process indicating that the operation is complete. The operation of the robot arm may require integration with several machines or lines, and the arm may simultaneously contain multiple tooling. Consequently, the programming or definition of a cycle of operation of the robot arm is a significant problem. Programming techniques for the above devices can generally be divided into two categories — offline programming and online programming.

Offline programming is executed at a location remote from the robot arm. The operation of the robot arm and its relationship to the physical process is simulated, and a program is defined as a function of the simulated operation. The program may be input to a record medium which is transmitted to the robot arm control. After receiving the programmed information, the robot arm may begin a new cycle of operation with a minimum loss of productive time.

There are a number of disadvantages to the offline programming technique. First, in order to preserve the integrity of the offline program, the machines involved in the physical process and the robot arm must have an exact alignment corresponding to the simulation. This is a difficult and expensive requirement in a manufacturing environment. The alignment problem may be alleviated if the absolute position of the machines can be determined with respect to the origin of the coordinate system of the robot arm. In many cases, the origin is buried within the structure of the arm and is not readily available for measurement. These problems represent severe restraints on the general applicability of offline programming. Further, if the above alignment requirements are not strictly maintained, the offline program will have to be debugged or tuned to conform to any deviation in alignment from the simulation.

The high cost of simulation plus the stringest alignment requirements have led many to an online programming technique. Generally, with the online technique, a robot arm is taught a cycle of operation by leading it through the desired motions. At a number of predetermined points in the path of operation, the robot arm operations are defined. The functions and the coordinate values of the predetermined points are input to a storage medium. The programming technique disclosed herein is of the online variety. It should be noted that in referring to the online technique, the terms programming and teaching are used interchangeably.

There are a number of systems shown in the prior art for teaching a robot arm a cycle of operation via the online technique. A first system often referred to as the playback technique requires that an operator physically hold the end of the robot arm or some other point close to the tooling and move the robot arm through its cycle of operation. While the operator is moving the arm, position signals are being produced by feedback devices; and these position signals are recorded on a record medium. When the cycle of operation is completed, the record medium is replayed; and the recorded signals are used as input signals. Consequently, the robot arm will regenerate the cycle of operation corresponding to the cycle which was taught.

The applicability of this technique is a function of the mechanical configuration of the robot arm. The arm disclosed herein is an articulated arm of substantial size and weight. Consequently, such a technique is impractical without using a complex array of counterbalance equipment or an expensive servomechanism control specifically designed for the teaching or programming mode. Although there may be other problems with the above online programming system, the inherent impracticalities of applying such a technique to a robot arm configuration disclosed herein precludes any further discussion.

A second system of online programming involves moving the robot arm through the cycle of operation in response to manual controls. Such manual controls may be push buttons, potentiometers or a teaching device having switching devices arranged in a general configuration corresponding to the degrees of freedom of the robot arm. Moving the teaching device in a particular direction will activate the switching devices; e.g., limit switches, strain gages or other devices producing digital or analog signals, which are operative to initiate robot arm motion. Consequently, the robot arm may be moved through its cycle of operation; and at a number of points, operational instructions; i.e., instructions which are not related to the position or orientation information, are programmed.

There are several disadvantages to the above online programming system. First, the system requires that the robot arm be located at an exact position corresponding to a number of predetermined points. A typical robot arm may include one or more axes of linear motion as well as one or more axes of rotary motion. Therefore, it is very difficult to move the controlled element to a number of predetermined points in space by using the axes of motion inherent in the robot arm configuration. Such motion requires a very unnatural thought process to mentally combine the axes of rotary and linear motion to reach a desired point. The disclosed apparatus overcomes the above problems by allowing a program to be taught relative to a coordinate system; e.g., a rectangular coordinate system, which is noncoincident with the generalized coordinate system of the robot arm but is more familiar to most operators and more relevant to the physical process.

Again, a number of problems exist in the prior art devices with regard to modifying information already programmed. Instead of reteaching the whole program, it may be desirable to change a single point in the program. Generally with the prior art system, a change in program data has to be related back to changes in the axes of motion of the robot arm. In contrast, in the disclosed system, the changes only need be described with reference to the teaching coordinate system which is chosen to be inherently more comprehensible. It may be argued that if a particular coordinate system is more desirable, then the robot arm configuration should conform to such a coordinate system. However, the problem is not so clearly defined. For example, when dealing with a moving conveyor system, a rectangular coordinate system is easy to work in and understand. However, configuring a robot arm after a rectangular coordinate system results in a device consuming excessive floor area.

The disclosed robot arm is an articulated arm which provides an adequate reaching capability while consuming a minimum of floor area. A spherical coordinate system is inherent in such a device and readily describes every location within the spherical volume defined by the robot arm range. However, robot arms are seldom required to be operative through their full volume of operation. Most often, they operate within some contained volume. Further, a coordinate system which is relevant to the contained volume is a function of the type of operation being performed. For example, as mentioned earlier, if the robot arm is operating in conjunction with a conveyor line, a rectangular coordinate system has a greater degree of utility than cylindrical or spherical coordinate systems. However, if one is moving workpieces from one location to another, such motion may be most readily described by a rotation. Therefore, a cylindrical coordinate system may be of greater utility.

The prior art systems are limited in that the teaching process occurs by defining coordinate values relative to the coordinate system defined by the physical configuration of the robot arm. The system disclosed herein is free of the above disadvantages. The disclosed robot arm is able to employ a configuration having the maximum range of operation while consuming a minimum of floor space. Further, the program may be defined in coordinate values relative to a teaching coordinate system different from the coordinate system of the robot arm. Further, one or more teaching coordinate systems may be used interchangeably depending on the type of operation being programmed.

A further limitation exists in the prior art systems which is function of the control of the robot arm. In most prior art systems each axis of motion moves independently at a fixed rate until a programmed displacement is satisfied. Consequently, the axis of motion having the shortest displacement completes its move first, and the axis of motion having the largest displacement is the last to complete its move. The result is that the robot arm moves from one predetermined point to another along an irregular path. Consequently, it is very difficult to exactly predict the robot arm motion around obstacles without programming a great number of otherwise unnecessary points. In contrast, the controlled element of the disclosed robot arm always moves along a straight path between the programmed points. Consequently, the ultimate motion of the robot arm is much easier to visualize, and the programming is correspondingly easier. Further, in many cases, fewer points are required to guarantee the avoidance of obstacles.

SUMMARY OF THE INVENTION

According to one embodiment of the invention, a method and apparatus is disclosed for generating a program for a robot arm operated by a controller having a memory. By executing a repetitive cycle of the program during the execution of a physical process, the robot arm is integrated into the operation of the physical process. The program is comprised in part of input signals representing first coordinate values relative to a first coordinate system of predetermined points being connected by predetermined paths generated by the controller during the automatic mode of operation. The robot arm has a geometric configuration defining a generalized coordinate system, and further, the robot arm contains a plurality of actuators with at least one of said actuators defining an axis of rotation affecting the position of the robot arm. Means are provided for producing a command signal representing robot arm motion along a selected axis of the first coordinate system. Means are responsive to the command signal for generating sets of first signals representing first coordinate values relative to the first coordinate system of a number of points along the selected axis. Means are further provided for producing individual control signals representing generalized coordinate values of the points. Further means are provided which are responsive to the individual control signals for causing the actuators to move the end of the robot arm to the points along the selected axis of the first coordinate system. Storage means are provided for storing a set of first signals defining a set of input signals and representing first coordinate values of each of the predetermined points. Finally, means are provided for generating and storing further input signals to identify one of the predetermined points as a repeat point thereby defining the repetitive cycle of the program.

f. manually initiated means

Figure 12:
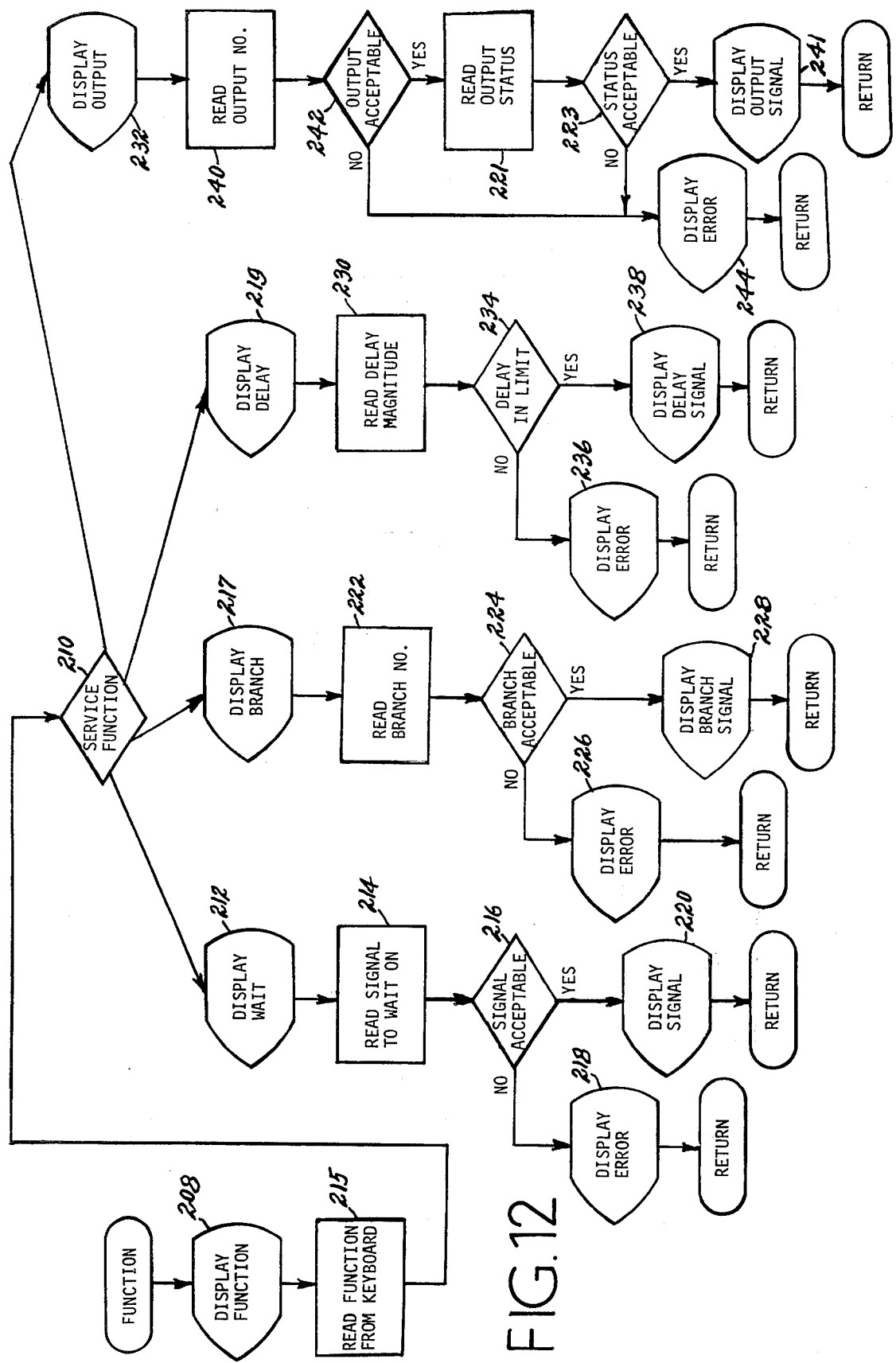

FIG. 12 is a detailed flow chart of a routine for programming a number of predetermined functions.

Figure 13:
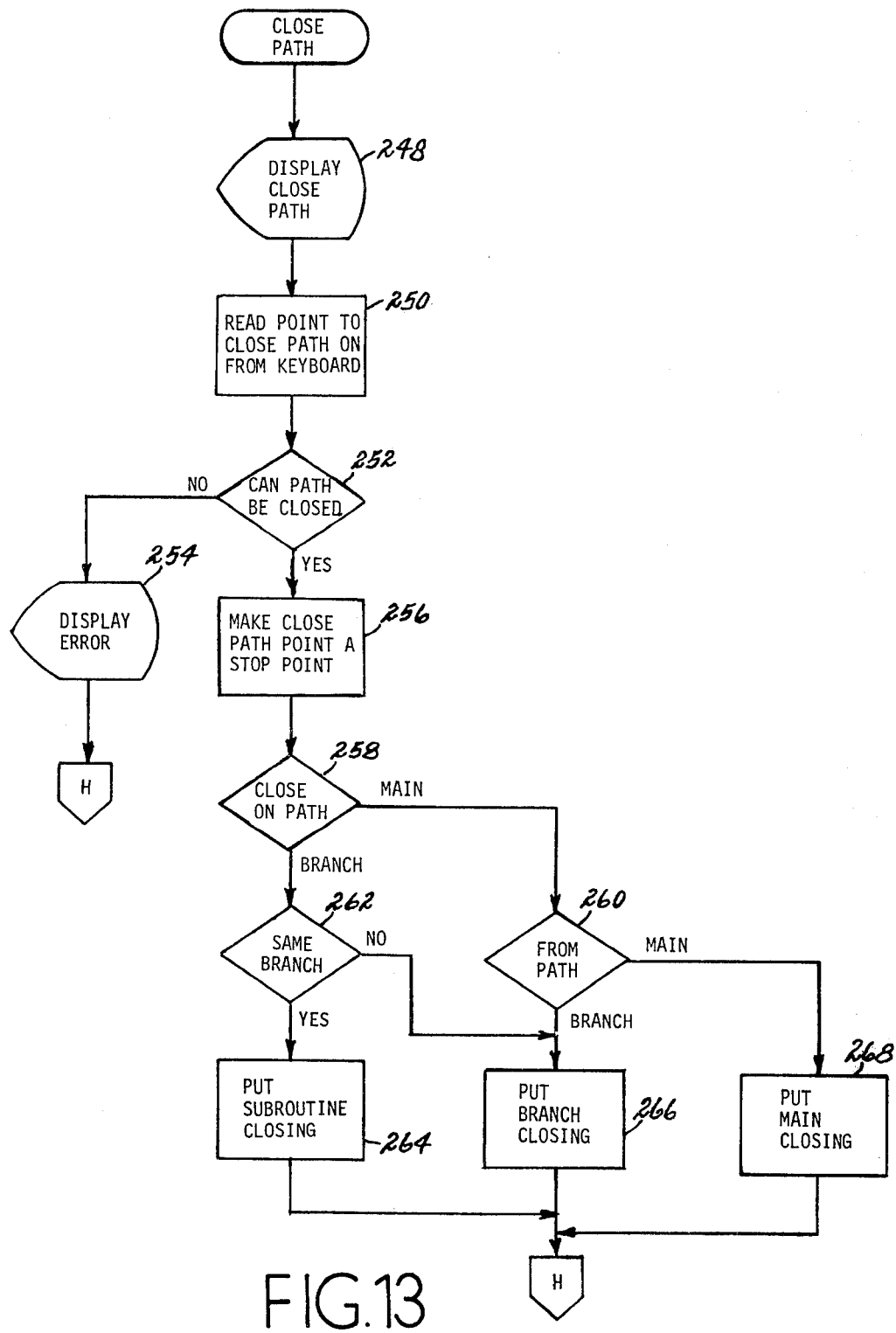

FIG. 13 is a detailed flow chart of a routine for closing the path of the robot arm on a previously programmed point.

Figures 14, 15:
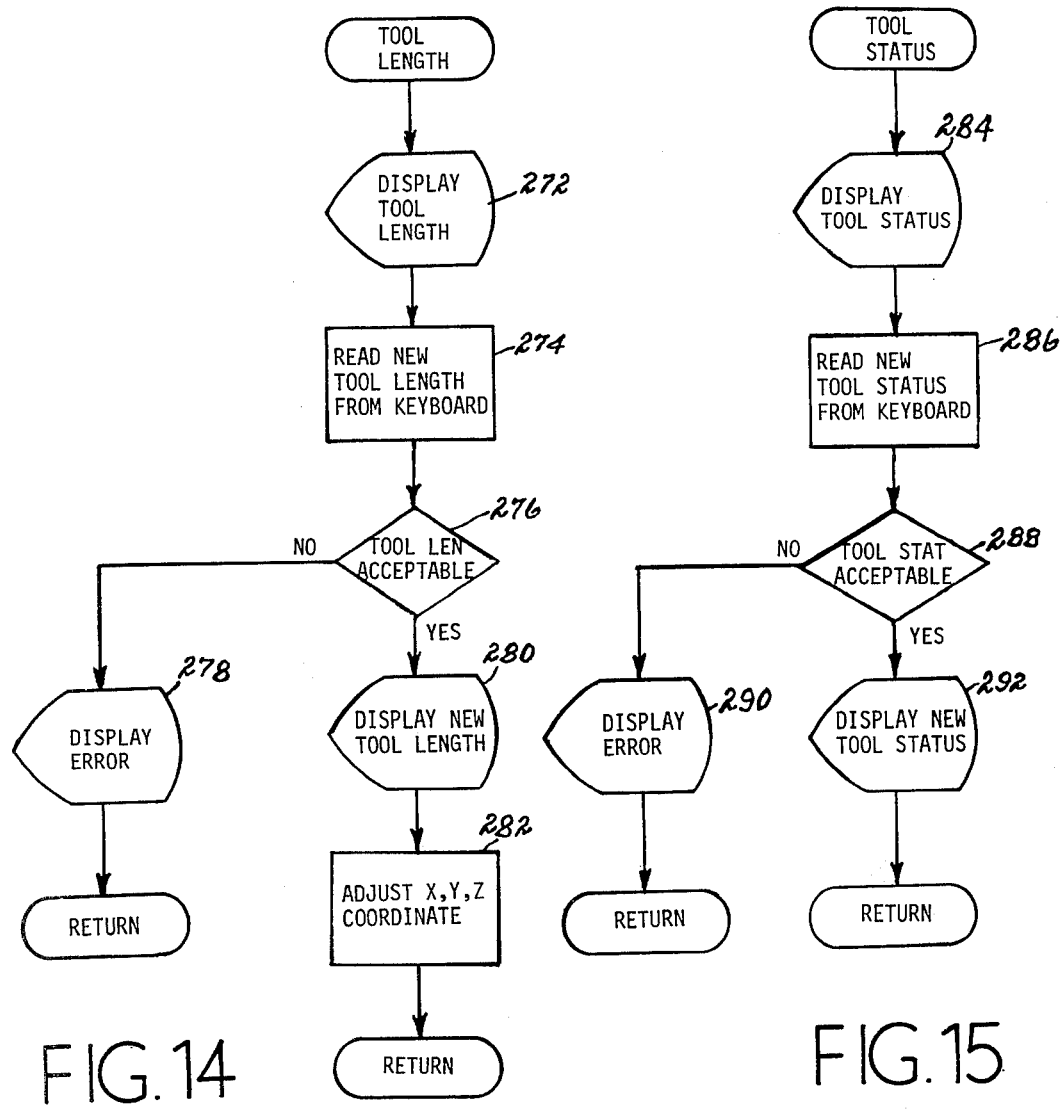

FIG. 14 is a detailed flow chart of a routine for programming tool length information.

FIG. 15 is a detailed flow chart of a routine for programming tool status information.

Figures 16, 18:
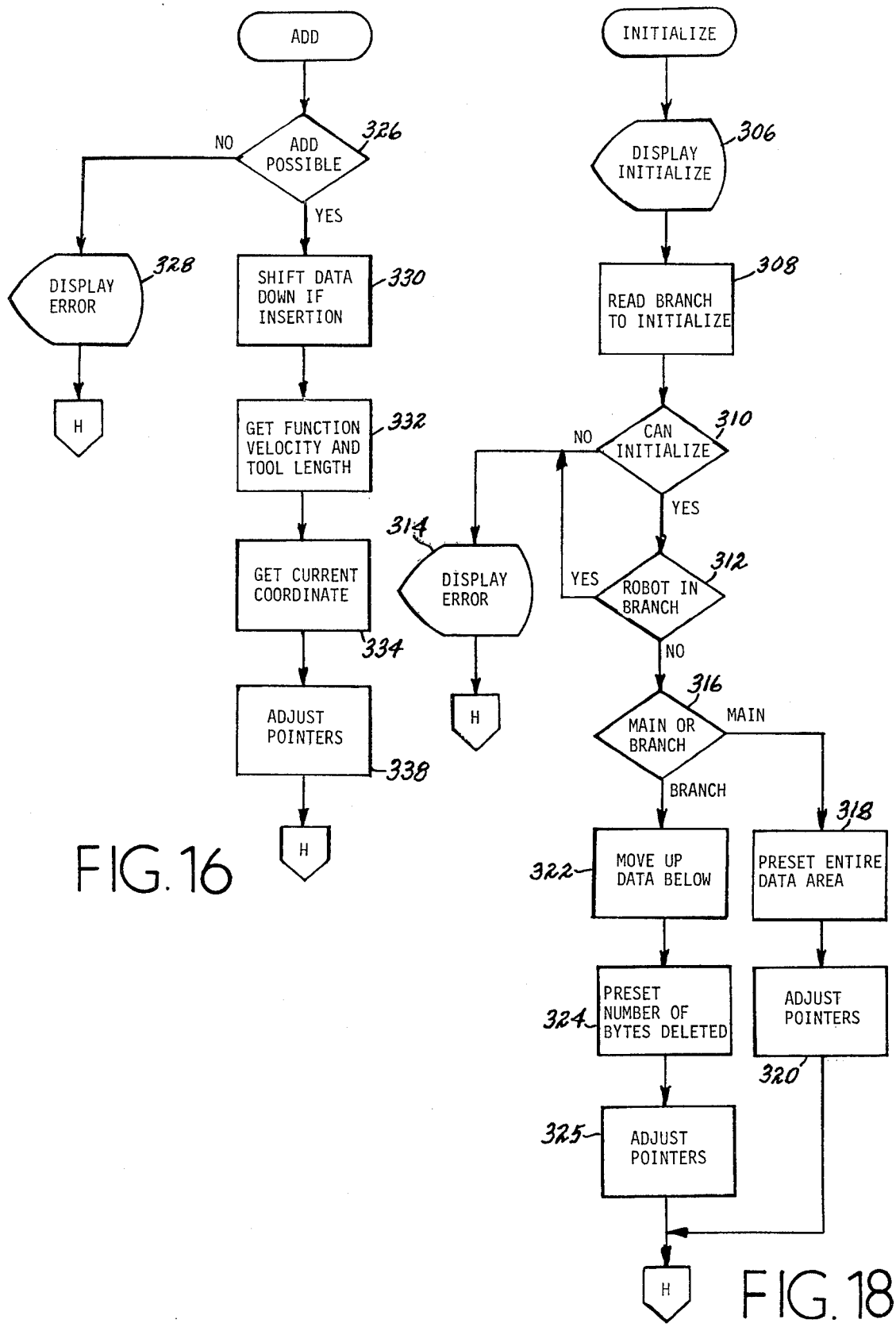

FIG. 16 is a detailed flow chart of a routine for adding points to the program.

Figure 17:
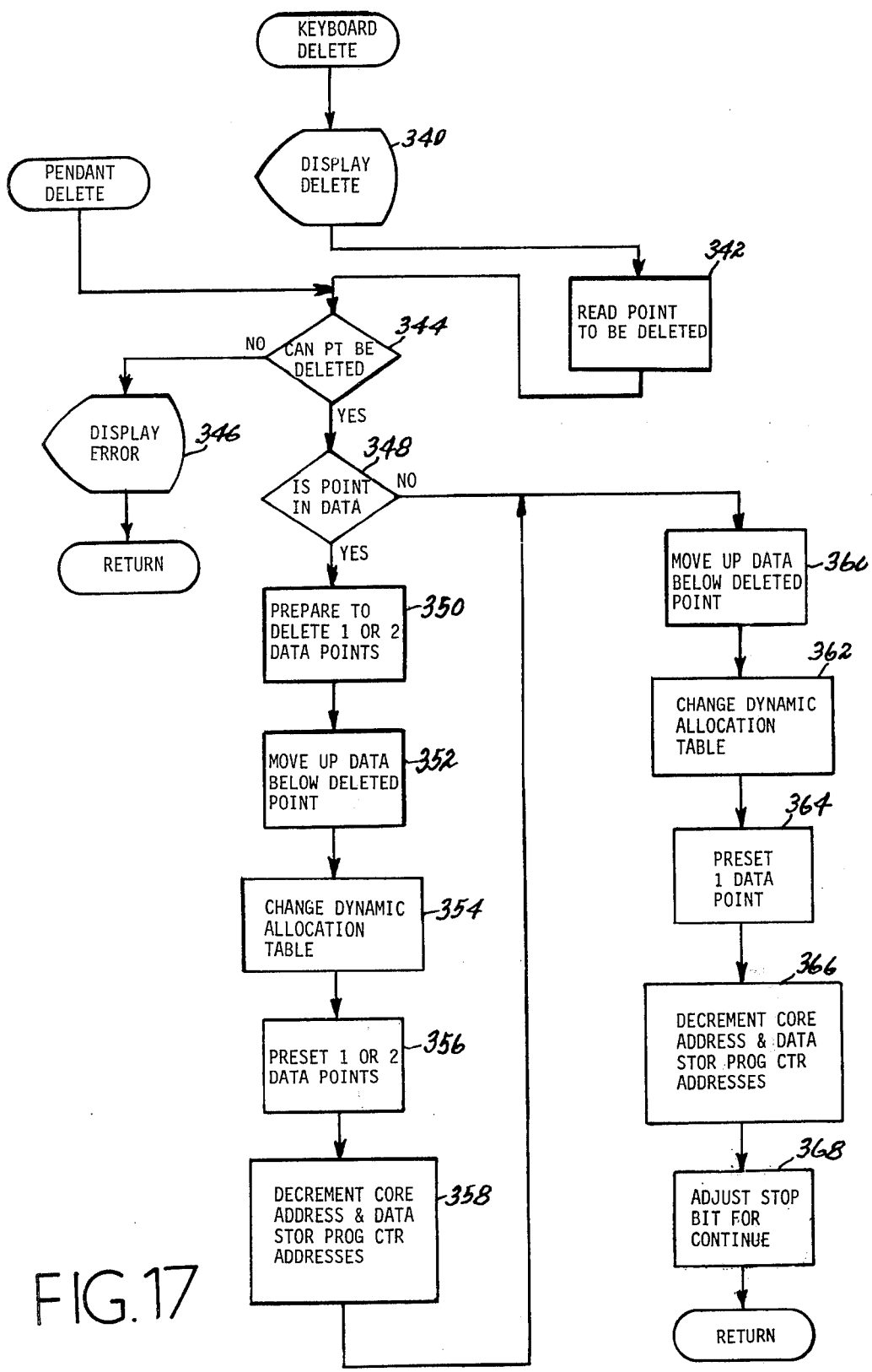

FIG. 17 is a detailed flow chart of a routine for deleting points from a program.

FIG. 18 is a detailed flow chart of a routine for deleting whole programs or portions thereof.

FIG. 19 is a detailed flow chart of a routine for recalling a point from memory and displaying said point.

FIG. 20 is a detailed flow chart of a routine for replaying the program one point at a time, either in the reverse or forward mode.

FIG. 21 is a detailed flow chart of a routine for executing a preprogrammed function.

DESCRIPTION OF THE PREFERRED EMBODIMENT

Figure 1:
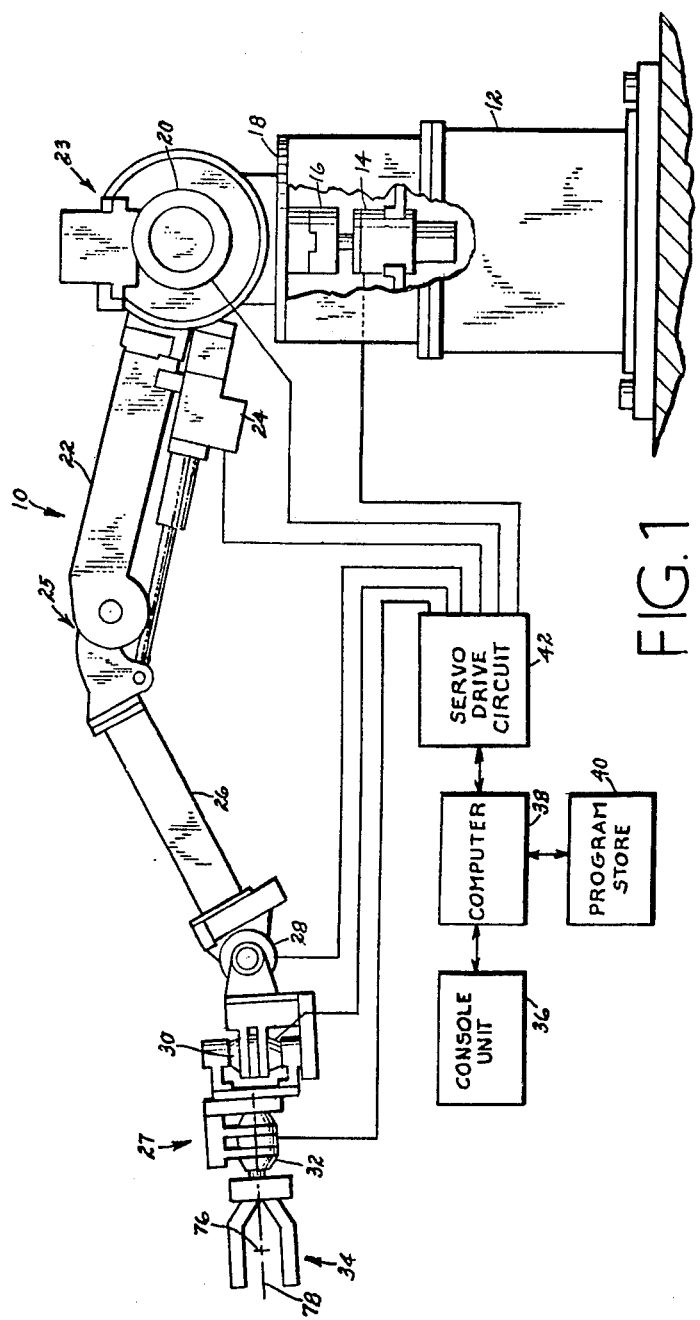
FIG. 1 is a overall view of a robot arm and illustrates its relationship to a general computer control system.

FIG. 1 illustrates the general configuration of a robot arm of the type used by applicant, and FIG. 1 further includes a general block diagram of the control apparatus for the robot arm. The detailed structure of the robot arm is not important to the present application. Further, as used herein, the term robot arm encompasses any machine having at least one axis of rotary motion for controlling the position of a working or functional machine element. The illustrated robot arm 10 is comprised exclusively of axes of rotary motion. A base 12 contains an actuator 14 which is connected by means of a coupling 16 to a rotatably mounted plate 18. It should be noted that the exact nature of the actuator 14 is not significant to this disclosure. Prior art methods of actuator control, whether the actuator is electric, hydraulic, pneumatic, etc., are applicable. Rigidly fixed on the plate 18 is an actuator 20 providing a second axis of rotation. An upper arm 22 is attached to a working member of the actuator 20. The mechanical joint between the upper arm 22 and the actuator 20 will be generally referred to as the shoulder joint 23. Affixed to the upper arm 22 is an actuator 24 which provides a rotation of a lower arm element 26 about the upper arm element 22. The mechanical joint joining the upper arm 22 to the lower arm 26 will be referred to as the elbow joint 25.

The actuators 14, 20 and 24 are sufficient to move the end of the robot arm 26 to any point in space within its range. Therefore, when the position of the arm is discussed herein, one will be referring to these three axes of rotary motion. In other words, these three axes of rotation must be controlled to define the predetermined path of the end of the robot arm. A hand 27 is comprised of rotary actuators 28, 30 and 32 and a function element 34. Many types of tooling may comprise the function element 34. The predetermined path is defined by the robot arm moving a work point on the function element through space in response to the program. The exact location of the work point will be a function of the tooling used. For example, the work point may be the point at which gripping tongs come together, the point at which welding heads come together, the center of an orifice of a spray gun, etc. Practically speaking, the work point represents the end of the robot arm. Therefore, in the specification and the appended claims, any reference to the end of the robot arm shall be construed as meaning the work point of the function element.

In addition to maintaining a predetermined point on the function element at a predetermined position, it may be required that the function element be aligned along a vector or a plane passing through the predetermined point. The latter requirement is generally referred to as orientation. In contrast, it may be required that the function element assume a new orientation with a new position. The apparatus disclosed by applicant is capable of changing the orientation of the function element in proportion to the change in the position of the element along the predetermined path.

The distinctions between position and orientation drawn above are not absolute. As will be appreciated by those skilled in the art, a change in position or orientation may cause a corresponding change in orientation or position respectively. The disclosed apparatus has 6° of freedom which correspond to the six disclosed controlled axes of motion. It should be noted that the function element 34 has a small actuator (not shown) for generating a desired function; e.g., a gripping action. Inasmuch as the actuator for the function element 34 does not represent a controlled axis of motion, its structure and operation will not be discussed in any further detail.

A console unit 36 is provided as a communication link to the robot arm. The console includes general control functions and input devices for generating input signals to enable a predetermined cycles of operation. The console further includes controls for programming or teaching the robot arm a cycle of operation. A computer 38 uses programs from a program store 40 and input signals produced by the console unit 36 to generate a predetermined path therefrom and product electric signals to a servomechanism drive circuit 42. Drive circuit 42 commands the actuators on the robot arm to move the function element along the predetermined path.

The general operation of a robot arm, as illustrated in FIG. 1, is disclosed in detail in a co-pending application, Ser. No. 364,381, assigned to the present assignee. The programming method and apparatus disclosed herein is completely compatible with the operation of the robot arm as disclosed in the co-pending application. Since the servomechanism drive circuit 42 may be of any standard design typically used on numerically controlled machine tools, it will not be discussed in any further detail.

Figure 2:
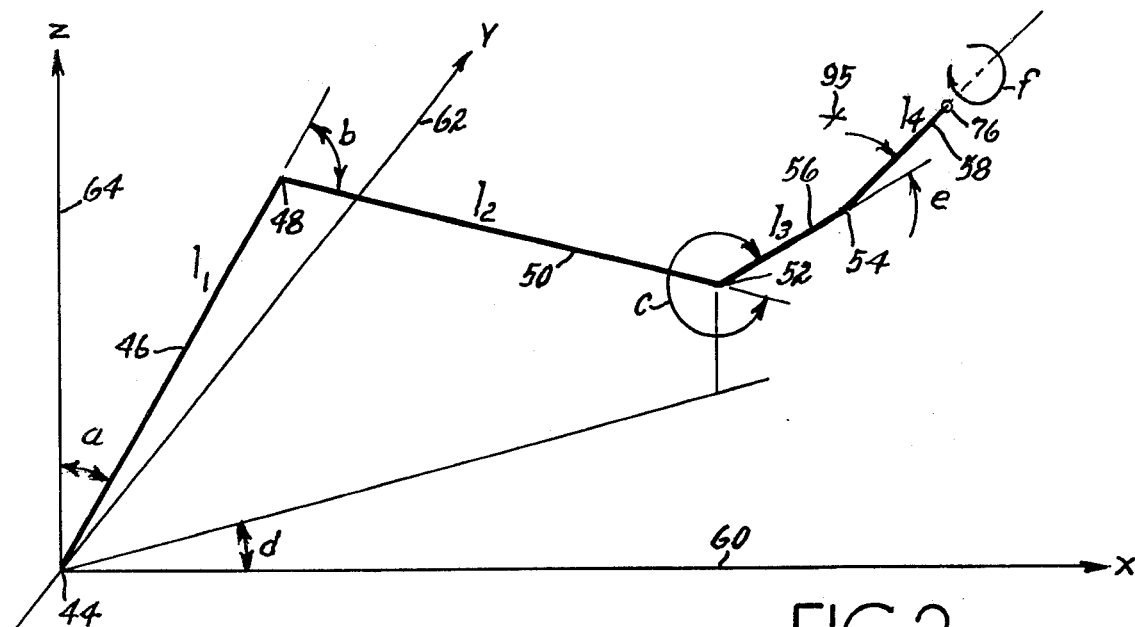
FIG. 2 is a graphical representation of the robot arm which illustrates the relationship between a rectangular coordinate system and the generalized coordinate system of the robot arm.

FIG. 2 is a graphic representation illustrating a generalized coordinate system of the robot arm within a rectangular coordinate system. The origin 44 of the rectangular coordinate system is located at the intersection of the axis of rotation of the base and the axis of rotation in the shoulder joint. The line segment 46 corresponds to the upper arm, the intersection 48 corresponds to the elbow joint 25 and the line segment 50 corresponds to the lower arm 26. The actuators 28 and 30 are represented by the intersections at points 52 and 54 respectively. The line segment 56 represents the distance between the actuators 28 and 30, and the line segment 58 represents the distance between the point 76; i.e., the end of the robot arm and the actuator 30. The actuator 32 causes a rotation about an axis defined by the line segment 58.

The position of the point 76 is generally controlled by the angular axes of motion defined by the angles $a$, $b$ and $d$ of the generalized coordinate system. However, different positions are programmed and stored relative to the rectangular coordinate system. Therefore, the different positions are uniquely defined by coordinate value signals relative to the $x$, $y$ and $z$ coordinate axes 60, 62 and 64 respectively. The control is responsive to the stored position expressed by rectangular coordinate value signals to generate output signals representing changes in the values of the generalized coordinate angles $a$, $b$ and $d$ of the robot arm. The orientation of the function element through the point 76 is controlled by the orientation angles $c$, $e$ and $f$ of the generalized coordinate system. However, the orientation is programmed by using coordinates m, n and p which are defined relative to a rectangular coordinate system having its origin located at point 54.

Figure 3:
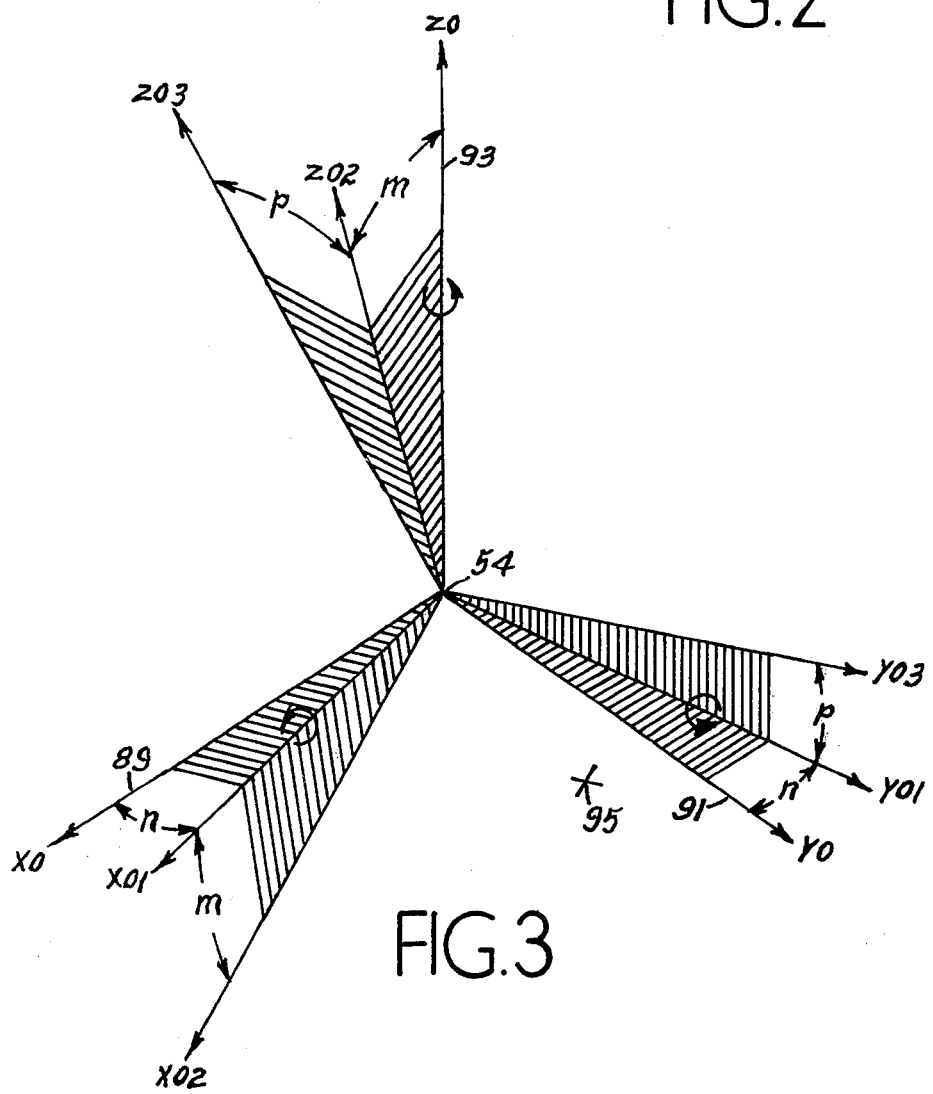
FIG. 3 is a graphical representation of the angular orientation axes which are used in programming the robot arm.

This coordinate system is shown in FIG. 3. With no orientation, each of the orientation axes $x_0$, $y_0$, and $z_0$, 89, 91 and 93 respectively is parallel to a corresponding $x$, $y$ or $z$ axis 60, 62 or 64 respectively. The first orientation angle is defined by rotating the $x_0$ and $y_0$ axes about the $z_0$ axis. This causes the $x_0$ and $y_0$ axes to be displaced from their original position by an angle $n$. These axes assume a new position indicated by the axes $x_{01}$ and $y_{01}$. The $n$ angle is generally referred to as yaw. Next, the coordinate system is rotated about the new $y_{01}$ axis. This causes the $x_{01}$ and $z_0$ axes to assume new positions indicated by the axes $x_{02}$ and $z_{02}$. The angle generated by the rotation about $y_{01}$ axis is defined as the m angle and is generally referred to as pitch. Finally, the coordinate system is rotated about the $x_{02}$ axis which causes the $y_{01}$ and $z_{02}$ axes to have new positions indicated by the axis $y_{03}$ and $z_{03}$. The rotation about the $x_{02}$ axis generates an angle p which is generally referred to as roll. Consequently, the orientation of the function element is programmed and stored relative to the angles $m$, $n$ and $p$; and the computer transforms these angular values into changes in the values of the generalized coordinate angles $c$, $e$ and $f$. The motion of the robot arm in its generalized coordinate system in response to data contained in the rectangular coordinate system is thoroughly discussed in the earlier referenced co-pending application.

Figure 4:
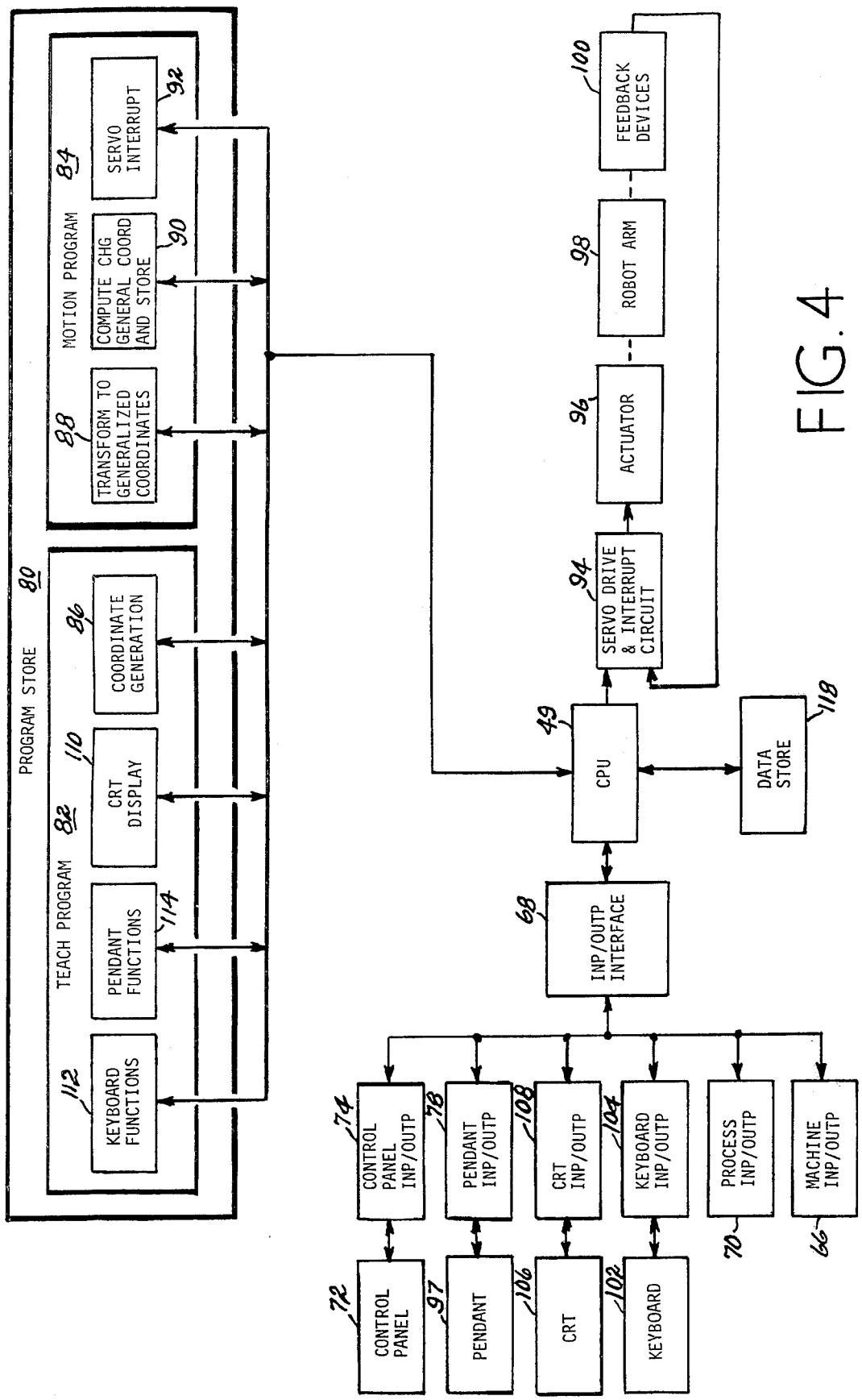
FIG. 4 is a detail block diagram of a computer control for teaching the robot arm a cycle of operation.

FIG. 4 is a detailed block diagram illustrating the apparatus required for programming a cycle of operation. In the diagram, the robot arm is shown in block form. However, during the programming operation, the robot arm must physically be located adjacent to the machine or physical process in which it is to be used. In the programming process, the robot arm is led through its cycle of operation by a means of manual controls; and at the appropriate locations, the desired functions are programmed. These appropriate locations are defined by the physical structure and relative positions of the machines and apparatus of the physical process. The locations are, in effect, predetermined by the physical environment in which the robot arm must operate. Therefore, in the specification and the appended claims, the term predetermined point refers to these appropriate locations defining the desired path of the robot arm.

A machine input-output circuit 66 operates in conjunction with the CPU 49 in controlling various devices; e.g., solenoid valves, limit switches, etc., on the robot arm itself. The process input-output device 70 integrates the operation of the robot arm into a physical process where required by providing communication links between the robot arm and the process. A control panel 72 and its corresponding input-output device 74 provide general robot arm controls. The control panel provides the general power functions, a selection between the teaching and automatic modes of operation, velocity override controls, and cycle controls. After power is applied to the robor arm it is aligned to the control; and upon selecting the teach mode, the programming process may be initiated.

Figure 5:
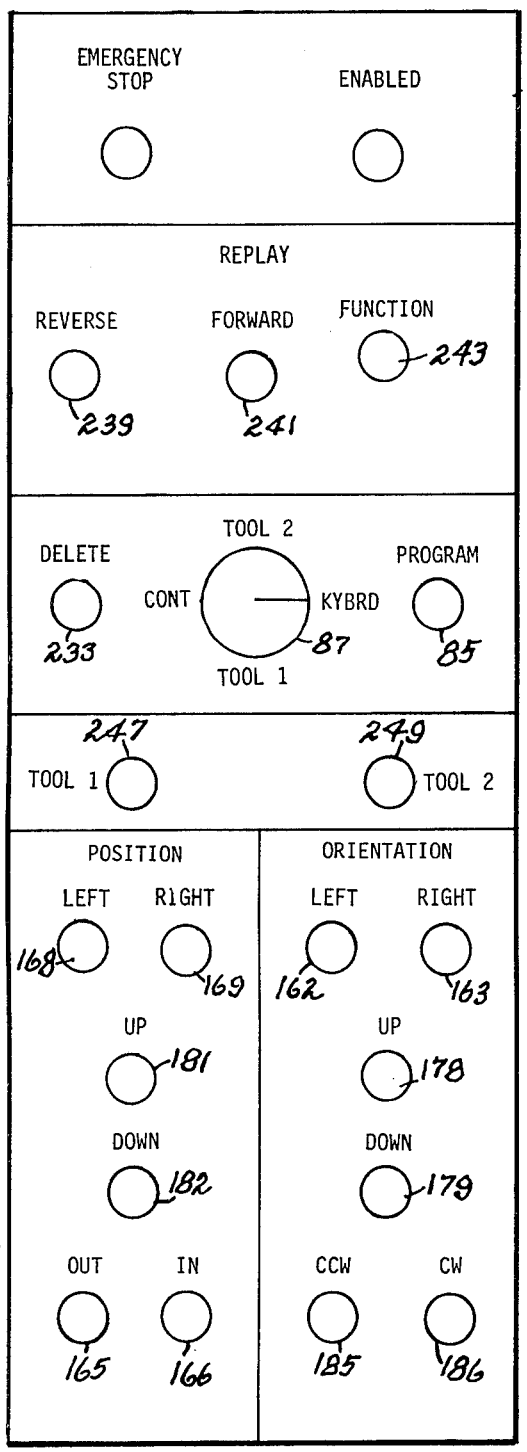
FIG. 5 is a diagram of the pendant which is used in programming a cycle of operation.

As discussed earlier, in programming a robot arm by the lead through technique, the information programmed can be divided into two general categories. The first category is the program information relating to the position and orientation of the robot arm; and the second category relates to the functional information which integrates the operation of the robot arm into the physical process during the automatic mode. In the preferred embodiment, the position and orientation information is generated by a pendant 97 and its corresponding input-output circuit 78. A detailed diagram of the pendant is shown in FIG. 5. The motion of the robot arm is defined by push buttons on the pendant. A first group of push buttons typically shown at 75 are operative to command changes in position, and a second group of push buttons typically shown at 77 are operative to command orientation changes. As mentioned earlier, the programming of the robot arm may be relative to a rectangular coordinate system. The origin of this system is located at the intersection at the base and shoulder joints. The pendant is hand-held by the operator and permits the operator to walk around the general area of the robot arm thereby providing a better view of the cycle of operation. The operator may change the position of the end of the robot arm by pushing the appropriate position push buttons 75. As indicated by the labels in FIG. 5, the end of the robot arm may be moved in the positive direction along the y-axis by push button 168, in the negative direction along the y-axis by push button 169, in the positive direction along the z-axis by push button 181, in the negative direction along the z-axis by push button 182, in the positive direction along the x-axis by push button 165 or in the negative direction along the x-axis by push button 166. In a similar manner, the function element may be oriented in a plane by activating the appropriate orientation push buttons 77. As indicated by the labels, the function element may be oriented in the positive direction along the n-axis by push button 162, in the negative direction along the n-axis by push button 163, in the positive direction along the m-axis by push button 178, in the negative direction along the m-axis by push button 179, in the positive direction along the p-axis by push button 185, or in the negative direction along the p-axis by push button 186. These motions correspond to the yaw, pitch and roll, respectively, of the function element.

As will be discussed later, the pendant may be used to move the function element of the robot arm relative to a cylindrical coordinate system. This coordinate system is also different from the generalized coordinate system of the robot arm. The cylindrical coordinate system has $r$, $z$ and $\theta$ axes of motion. The z-axis is coincident with the z-axis of the rectangular coordinate system. The $\theta$-axis rotates about the z-axis in a plane defined by the x- and y-axes of the rectangular coordinate system. The r-axis or radius moves in a plane perpendicular to the z-axis and passes through the end of the robot arm, and the motion of the end of the robot arm in said plane is along a radial line from the z-axis. The end of the robot arm may be rotated in a positive direction or clockwise along the $\theta$-axis by push button 168 in a negative direction or counterclockwise along the $\theta$-axis by push button 169 in a positive direction along the z-axis by push button 182, in a negative direction along the z-axis by push button 182, in a positive direction along the r-axis by push button 165 or in a negative direction along the r-axis by push button 166. In activating the position and orientation push buttons on the pendant, the operator provides command signals to the CPU 49 commanding a particular motion.

As shown in FIG. 4, the CPU 49 operates in conjunction with a program store 80 which contains a teach program 82 and a motion program 84. Within the teach program 82 is a coordinate generation routine 86, which is responsive to the command signals produced by the activated push buttons on the pendant, to provide sets of first signals representing rectangular coordinate values defining the desired robot arm motion. The sets of first signals produced by the coordinate generation routine are used by a transformation routine 88 in the motion program 84 to produce sets of individual control signals representing equivalent generalized coordinate values. A routine 90 is operative to compute the necessary change in the generalized coordinates from a present position, and this change is temporarily stored. Next, a servo interrupt routine 92 is operative to transmit this change in generalized coordinate information through the CPU 49 to a servo drive circuit 94. The servo drive circuit 94 produces error signals to the actuators 96 which, in turn, move the robot arm 98. Feedback devices 100 connected to the robot arm provide a closed loop feedback to the servo drive circuits 94 thereby precisely controlling the motion of the robot arm.

When teaching in the rectangular coordinate system, the coordinate generation routine is operative to produce sets of first signals representing rectangular coordinate values of a plurality of points in a direction commanded by the position and orientation push buttons on the pendant. For example, upon depressing the push button 168 a command signal is produced; and the coordinate generation routine will produce a set of first signals representing rectangular coordinate values of a first point displaced in the positive direction along the y-axis of the rectangular coordinate system. The set of first signals is temporarily stored, transformed to individual control signals representing generalized coordinate values of the first point and transmitted to the servo drive circuit 94 which causes the end of the robot arm to move to said first point. As long as the push button 168 is depressed, the coordinate generation routine will continue to produce further sets of first signals representing rectangular coordinate values defining further first points in the positive direction along the y-axis. When a predetermined point is reached, the push button 168 is released. At this time, a program push button may be executed, and a set of first signals representing rectangular coordinate values of the predetermined point will be transferred to and stored in the data store 118.

When teaching the cylindrical coordinate mode, the coordinate generation routine 86 is responsive to a depression of push button 168 to produce sets of second signals representing cylindrical coordinate values of points in the positive direction along the θ-axis of the cylindrical coordinate system. The coordinate generation routine is responsive to the sets of second signals for producing sets of first signals representing rectangular coordinate values of the points. These sets of first signals are temporarily stored, transformed to individual control signals representing generalized coordinate values of the points and transmitted to the servo drive circuit 94 thereby causing the end of the robot arm to rotate along the θ-axis toward a predetermined point.

When the predetermined point is reached, the push button is released; and a program push button may be executed to transfer to the data store the sets of first signals representing the rectangular coordinate value signals corresponding to the predetermined point.

It should be noted that the earlier referenced copending application discloses an automatic mode of operation in which the end of the robot arm moves in straight line paths between the programmed points; therefore, the operator need only program points where either a function or a change in direction is required. Further, since the operator knows the arm is moving only in a straight line path, the programming of the function element around obstacles is greatly simplified. After the operator has moved the function element to a predetermiend point, certain other information may be programmed. The programming of this information requires the use of a keyboard 102 with its associated input-output circuit 104. For the convenience of the operator, a CRT display 106 and a corresponding input-output circuit 108 is provided.

Figure 6:
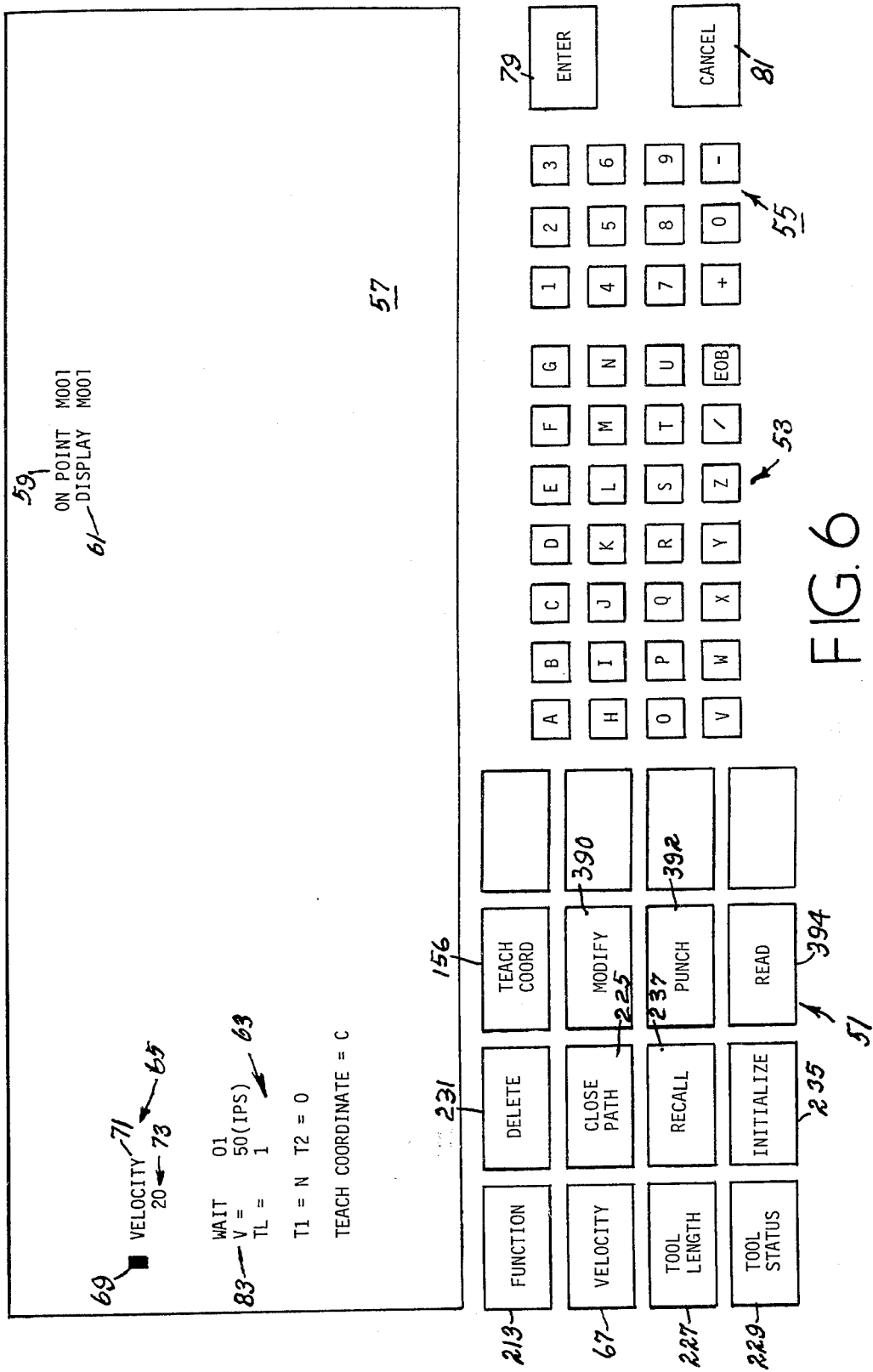
FIG. 6 is a diagram of the keyboard and CRT associated with the programming process.

A detailed diagram of the keyboard and CRT is shown in FIG. 6. The keyboard has a first set of keys typically shown at 51 for entering the function input signals that may be required in the cycle of operation. Next, a set of keys shown at 53 provide alphabetic code input signals, and a set of keys shown typically at 55 provide numeric code input signals. The CRT 57 displays information identifying the predetermined points and their associated functions. An ON POINT display line 59 identifies the point corresponding to the present physical location of the robot arm. The DISPLAY line of information 61 identifies the point associated with the functions which are presently being displayed. The functional information associated with the DISPLAY point is shown typically at 63 on the CRT. The area of the screen shown at 65 is keyed to a cursor 69 and responds to information being typed into the keyboard.

Two things should be noted at this time. First, there is a great variety of keyboards and associated CRTs commercially available. Any keyboard and CRT arrangement which provides a display to identify the points in the program and their associated functions may be used with the present invention. Second, the exact coordinate data associated with each point is not displayed. The reason for this is that the data itself is not important to the operator. He only needs to know that it exists, and its existence corresponds to a particular programmed point. The data can be changed or deleted by programming only the change required without ever knowing its exact magnitude. Even though the coordinate values may be displayed, such a display represents information which more than likely would tend to confuse the operator. Therefore, the coordinate values are not displayed.

After a particular position and orientation of the function element have been defined by physically moving the end of the robot arm to a predetermined point, the next bit of relevant information is the desired velocity required when moving the function element in the automatic mode of this particular position and orientation. Although the disclosed apparatus has the capability of selecting a number of velocity magnitudes to be effective in the automatic mode, there are a number of applications where only a single velocity is required. Consequently, the single velocity may be permanently established in the control thereby making the steps of programming a velocity unnecessary.

In the present system, to enter a velocity, the operator presses the velocity function key 67. This causes the cursor 69 and the word velocity 71 to appear on the CRT. Next, the numerical magnitude of the desired velocity is typed in. This numerical magnitude appears at 73 on the CRT. If the operator decides not to execute this function or determines that a mistake has been made, a cancel key 81 may be depressed which deletes the entire functional information. At this point, the function information may be typed in correctly. Upon depressing the enter key 79, the velocity value for the display point appears on the velocity information line 83. Next, the keyboard may be used to enter other desired functions which will be described later. These are entered in a similar manner by depressing the desired function key and typing in the alphanumeric information corresponding to the desired function. Referring back to FIG. 4, the keyboard function routine 112, pendant function routine 114 and CRT display routine 116 are used in programming the various functions. After all the function information for a predetermined point has been defined, the operator depresses a program push button 85 located on the pendant (FIG. 5); and the input signals representing the function information is transferred to the data store 118.

Associated with the program push button 85 is a program selector switch 87. When the selector switch is in the KYBRD position, the input signals representing the functional information displayed in the area 63 on the CRT will be transferred directly to the data store when depressing the program push button 85. The CONT position of the switch 87 permits a point to be programmed as a continue point. In the automatic mode, the end of the robot arm passes through a continue point without stopping and executing a function. Consequently, if the switch 87 is in the CONT position, depressing the program push button 85 will cause the input signals representing the functional information entered on the CRT to be ignored; and only the coordinate values associated with the present locations of the robot arm will be transferred to the data store. Upon depressing the program push button 85, the tool 1 and tool 2 positions of the selector switch 87 will produce a corresponding tool number signal which causes the display point and its functional information to be programmed in association with the selected tool.

In summary, the operator by means of the pendant push buttons, moves the arm from one predetermined point to another through the whole cycle of operation. At each point, by depressing the program push button, the functional data entered and the position data associated with said point are transferred to the data store 118. After a complete cycle of operation has been programmed, the control panel is used to put the robot arm in its automatic mode; and upon depressing a cycle start push button, the programmed cycle of operation will automatically and continuously iterate.

Figure 7:
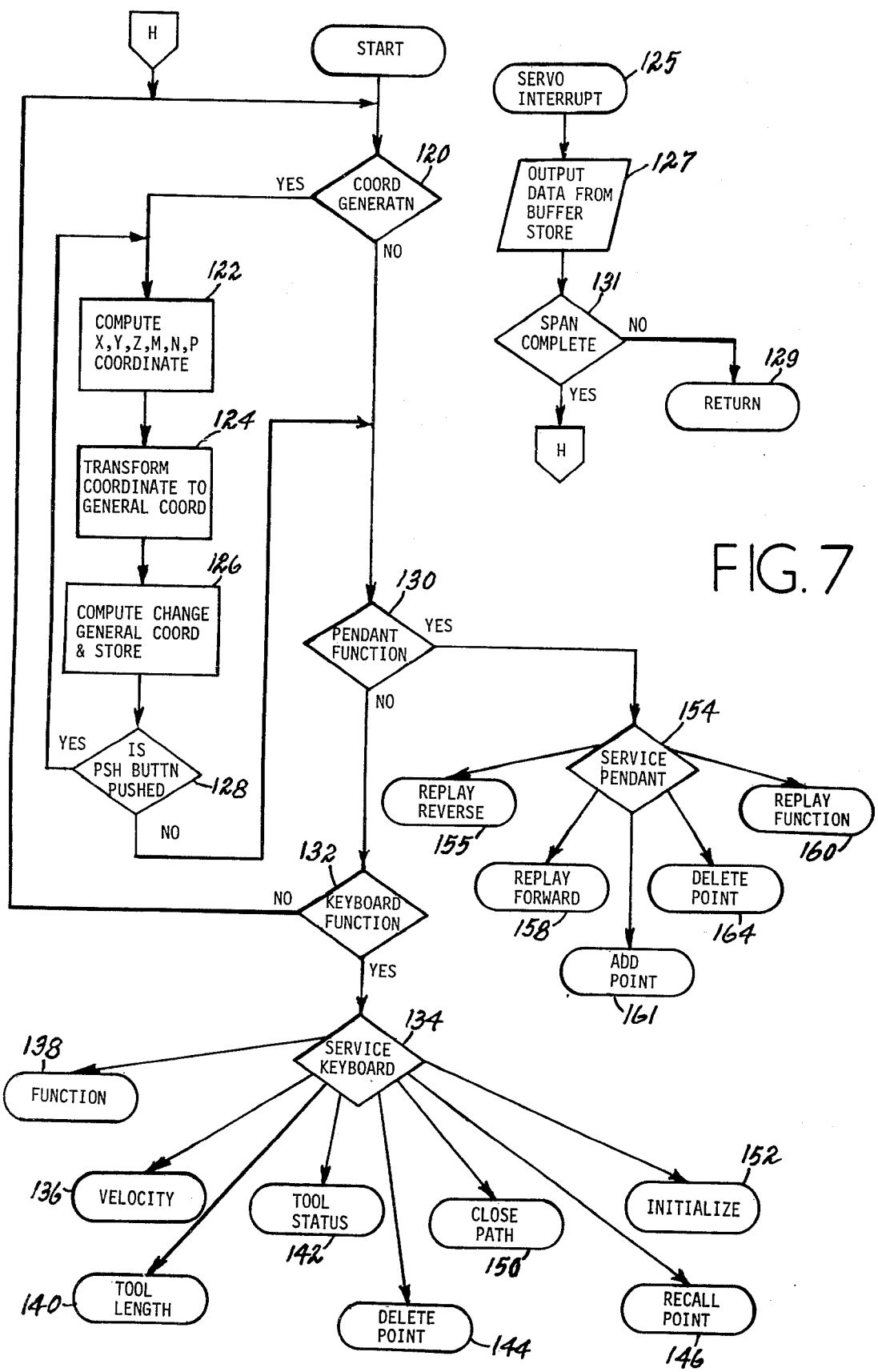
FIG. 7 is a flow chart illustrating the general method of the teaching process.

FIG. 7 illustrates the steps required to execute the programming process disclosed herein. FIG. 7 is general in nature and does not disclose every specific step required in the process. For example, the step of switching into the teaching mode of operation is not shown because it is an obvious step in the process. The first significant step is the determination of whether or not coordinate generation is required. This determination is made by process block 120. Coordinate generation is initiated by command signals produced by the push buttons typically located at 75 and 77 on the pendant shown in FIG. 5. If one or more of these push buttons are activated, the process moves to block 122 which requires the generation of coordinate value signals which are relative to a teaching coordinate system and noncoincident with the generalized coordinate system. After the successive point has been calculated by executing the process shown in block 124, the subsequent coordinate value signals are transformed to corresponding generalized coordinate value signals. Block 126 requires that the difference between the present generalized coordinate values and the new generalized coordinate values be calculated. Generalized coordinate value signals representing the difference are transferred to a buffer store. Next, decision block 128 determines whether or not one of the position or orientation push buttons is still depressed. If one of said push buttons is still depressed and a command signal is still present, the process moves back to block 122; and further coordinate value signals are generated corresponding to the push button activated. If none of the position and orientation push buttons are depressed thereby terminating the command signal, the process moves to block 130 which determines whether or not a pendant function is required.

A servo interrupt routine 125 removes the data from the buffer store and transfers said data to the servo drive and interrupt circuit 94. An interrupt may occur at any time during processing. When an interrupt does occur, the control of the process is transferred from the main program to the servo interrupt routine 125. Within the servo interrupt routine, process block 127 requires that signals representing the change in the generalized coordinate values be transferred from the buffer store to the servo drive circuit 94. Next, in decision block 131 a check is made to see if the commanded motion is complete. If the motion is not complete, the servo interrupt routine returns control of the process back to the main program at the point where the interrupt occurred; and the process is continued. If the commanded motion is complete, the process returns to block 120 to await another teach mode command. Consequently, the robot arm is moved to a new position corresponding to the calculated change in generalized coordinate values.

Block 132 determines whether or not a keyboard function is being programmed. Typically, at a programmed point, in addition to coordinate value information, functional information is also programmed. Therefore, the process goes to block 134 which services the keyboard functions. One or more of the functions associated with block 134 may be programmed depending on the physical relationship of the robot arm to its surroundings. A velocity routine 136 permits the operator to program a desired velocity which the robot arm will assume when moving to the predetermined point in the automatic mode. The function routine 138 permits the operator to program one of four predefined functions which will be described in detail later. The tool length routine 140 allows the operator to precisely define the end of the robot arm as a function of the tooling being used. In other words, the operator may modify the location of the point 76. Next, the tool status routine 142 is used to determined the type of output signal to be generated for actuating the tool. The delete point routine 144 is self-explanatory and permits the operator to delete a previously programmed point. The recall point routine 146 permits the operator to recall and display a point previously programmed. The close path routine 150 permits the operator to close a programmed path from some present position to a previously programmed point thereby creating a loop motion or operation. The initialize routine 154 permits the operator by means of single command to delete an entire segment of the program.

The programming operation is defined by two general types of programs. The first general program is called the mainline program. By definition, the mainline program controls all operations except those specified by branch programs. The second general program type is referred to as a branch program. A branch program represents a decision point within a program which is conditional upon the current physical state of the process. In other words, the branch program represents an operational loop which integrates the operation of the robot arm into a portion of the physical process. The branch program may or may not be executed depending on the condition of the process. It should be noted that a branch program may be initiated from the mainline program or from another branch program. Further, in contrast to the mainline program which may only close on itself, there is no limitation on the closing of a branch program; i.e., it may close on the mainline or on any branch. A branch program closing on itself is referred to as a subroutine. The distinction between the mainline and branch programs should be generally understood in order to appreciate the value of certain functions to be described later. For example, the initialize routine 152 may be used to delete a branch program or the mainline program with a single command. This provides the operator with a very powerful efficient programming tool.

At this point there is sufficient information to completely define a program of operation of the robot arm. The coordinate values of a point have been defined, and the various functions that may be associated with a particular point have been defined. There remains several functions that are of value which are located on the pendant. These functions are serviced by the process block 154 and are primarily used to modify or tune a program after it has been initially defined. For example, the replay reverse routine 155 permits the operator to retrace the steps back through a previously taught program to observe the operation of the robot arm. Similarly, the replay forward routine 158 permits the operator to return through the program thereby simulating the action which will occur in the automatic mode. The replay function routine 160 permits the programmed functions to be executed at each of the programmed points. The add point routine 161 and the delete point routine 164 permit the operator to add or delete various points in the program.

Figure 8:
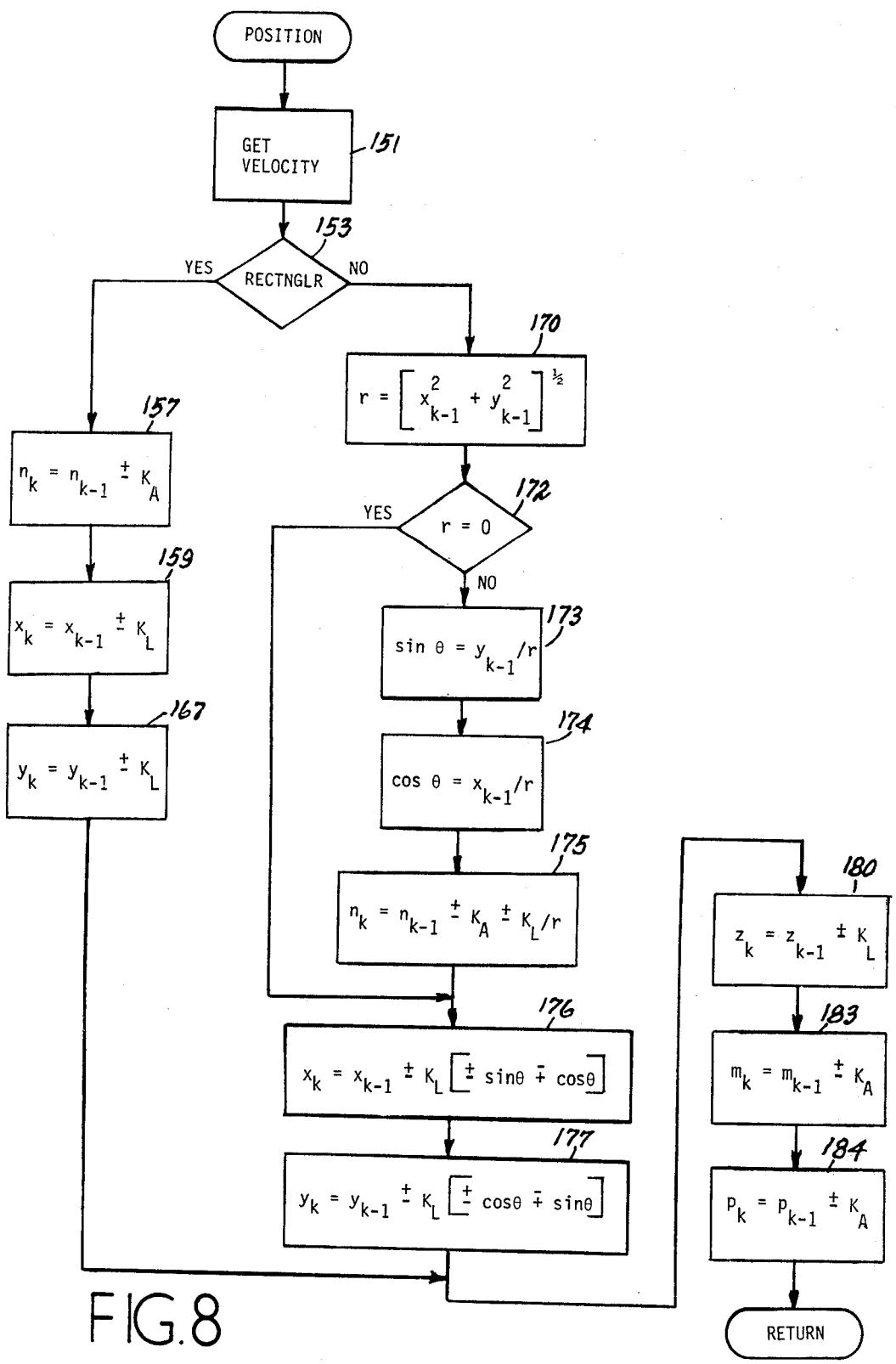
FIG. 8 is a detailed flow chart of a routine for calculating the coordinate values when moving the robot arm in teaching mode.

FIG. 8 illustrates the steps required to generate coordinate value signals in response to command signals produced by the actuation of pendant push buttons typically shown at 75 and 77 in FIG. 5. As discussed earlier, the robot is programmed by moving the robot arm along paths of motion relative to a teaching coordinate system which is noncoincident with the generalized coordinate system of the robot arm. Further, it was indicated that in many situations the availability of more than one teaching coordinate system may be desirable. In the preferred embodiment, the operator may select between a rectangular coordinate system or a cylindrical coordinate system. This selection is made by using the teach coordinate key 156 illustrated in FIG. 6. After depressing the key 156, the operator enters the appropriate code to produce either a rectangular coordinate teaching signal or a cylindrical coordinate teaching signal.

In referring to the earlier referenced co-pending application, it should be noted that the robot arm operates by generating output data signals to the servomechanism circuits during fixed intervals of time. Further, in moving the robot arm from one point to another in the teach mode of operation, the operator has a choice of a high and a low velocity. The robot arm will always move at the lower velocity unless the operator depresses a button (not shown) which causes the robot arm to move at a predetermined higher velocity. Consequently, if the velocity is predetermined and the data is output on a fixed interval basis, the distance moved during each time interval is defined. This distance may be stored in the control and used as required.

Referring to FIG. 8, process block 151 determines whether or not the high or low velocity has been chosen. Next, process block 153 determines whether or not the rectangular teaching coordinate system has been chosen. If the rectangular system has not been chosen, then the process assumes the cylindrical coordinate system is being used. If the rectangular system has been chosen, process block 157 calculates a new coordinate value signal for the n-axis. This is accomplished by taking the present n coordinate value and adding thereto a constant $K_A$ representing an angular change along the n-axis corresponding to the teaching velocity chosen. The angular change will occur in either the positive or negative direction depending on which of the push buttons, 162 or 163 respectively, is depressed. If push button 162 is depressed, the constant $K_A$ has a positive sign. If the push button 163 is depressed the constant $K_A$ has a negative sign. Process block 159 is operative to compute a new coordinate value signal for the x-axis. Again, the new x coordinate value is obtained by adding to the present x coordinate value a constant $K_L$ representing a linear change along the x-axis corresponding to the teaching velocity chosen. If the push button 165 is depressed, the constant $K_L$ has a positive sign, whereas depressing push button 166 will cause the constant $K_L$ to assume a negative sign. Process block 167 computes a new y coordinate value signal. In a similar manner, depressing push buttons 168 or 169 will cause the constant $K_L$ to have a positive or negative sign respectively.

If the cylindrical coordinate system having r, z and θ coordinates is chosen, process block 170 is operative to calculate the present r coordinate value signal. Next, process block 172 determines whether or not the radial coordinate is zero. Process blocks 173 and 174 are operative to calculate the present sin and cos values of the θ angular coordinate. Since the data is always stored in rectangular coordinates, it is necessary to transform the cylindrical coordinate value signals to corresponding rectangular coordinate value signals. This is the function of process blocks 175, 176 and 177. Process block 175 calculates a new n coordinate value signal as a function of commanded motion relative to a cylindrical coordinate system. The constant $K_A$ will have a positive or negative sign depending on which of the push buttons 178 or 179, respectively, is depressed. Activating the push buttons 168 or 169 will cause $K_L$ to have a positive or negative sign respectively. Process block 176 computes a new x coordinate value signal as a function of motion relative to the cylindrical coordinate system. Again, the $x$ coordinate value will change as a function of motion commanded by push buttons 165 and 166 which control motion in the radial direction and push buttons 168 and 169 which command motion in the angular direction. The COS $\theta$ will assume a positive or negative sign depending on whether push buttons 165 or 166, respectively, are activated. Further, the SIN $\theta$ will assume a negative or positive sign depending on whether push buttons 168 or 169, respectively, are depressed. In calculating a new $y$ coordinate value signal, as indicated by process block 177, the calculation is similar to the one described in process block 176. However, the SIN $\theta$ will assume a positive or negative sign depending on whether push buttons 165 or 166, respectively, are activated. The COS $\theta$ will assume a negative or positive sign depending on whether push buttons 168 or 169, respectively, are depressed. Process block 180 calculates a new Z coordinate value signal.

The $z$ coordinate calculation is the same whether the teaching occurs in the rectangular or cylindrical mode. The sign of the constant $K_L$ will be positive or negative depending on whether push buttons 181 or 182, respectively, are depressed. Process block 183 calculates a new m coordinate value signal, and the constant $K_A$ will assume a positive or negative sign depending on which of the push buttons 162 or 163 respectively, are depressed. Process block 184 calculates a new P coordinate value signal, and the constant $K_4$ will have a positive or negative sign depending on whether the push buttons 185 or 186 respectively, are depressed.

Figure 9A:
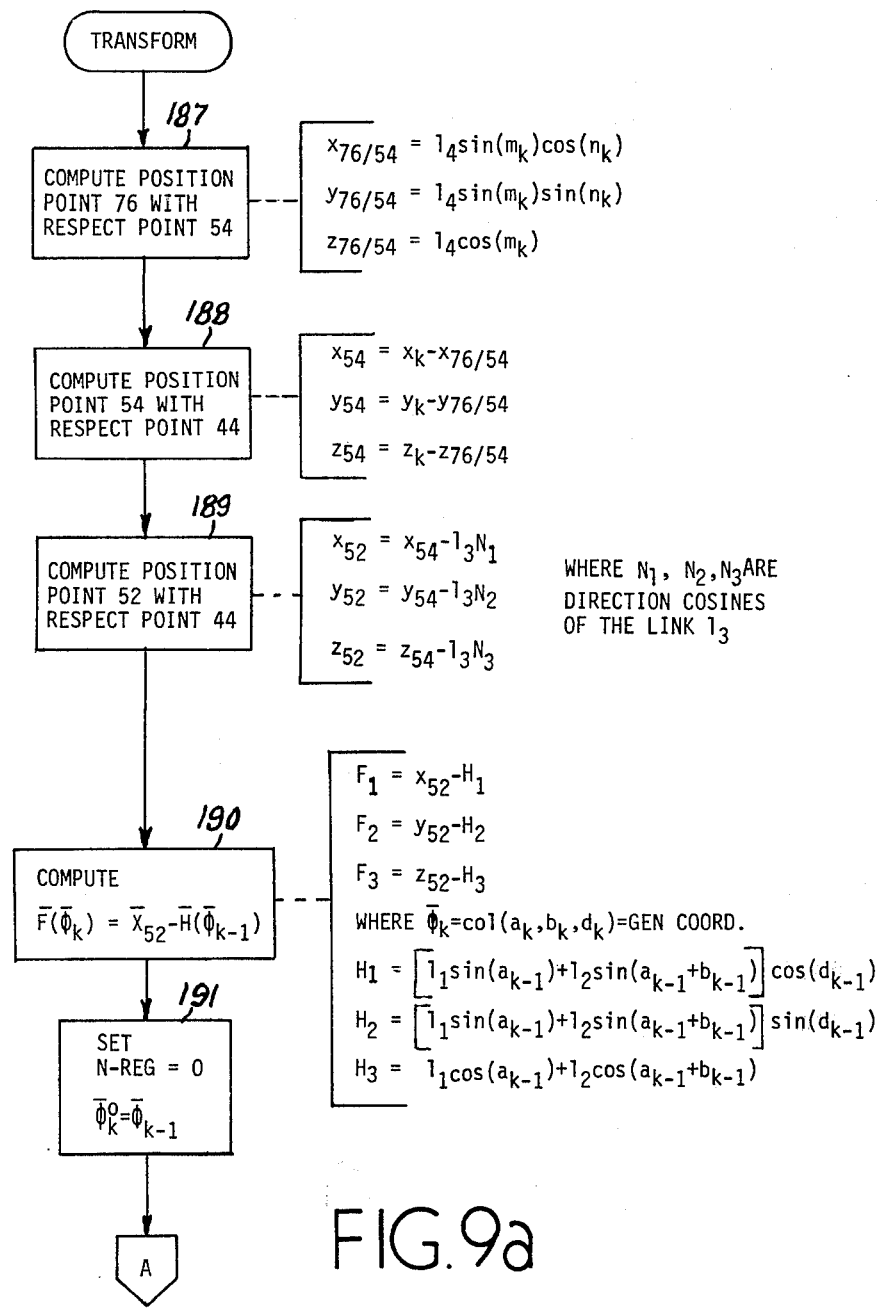
FIGS. 9a–9c is a detailed flow chart of a routine for transforming rectangular coordinate values to generalized coordinate values.
Figure 9B:
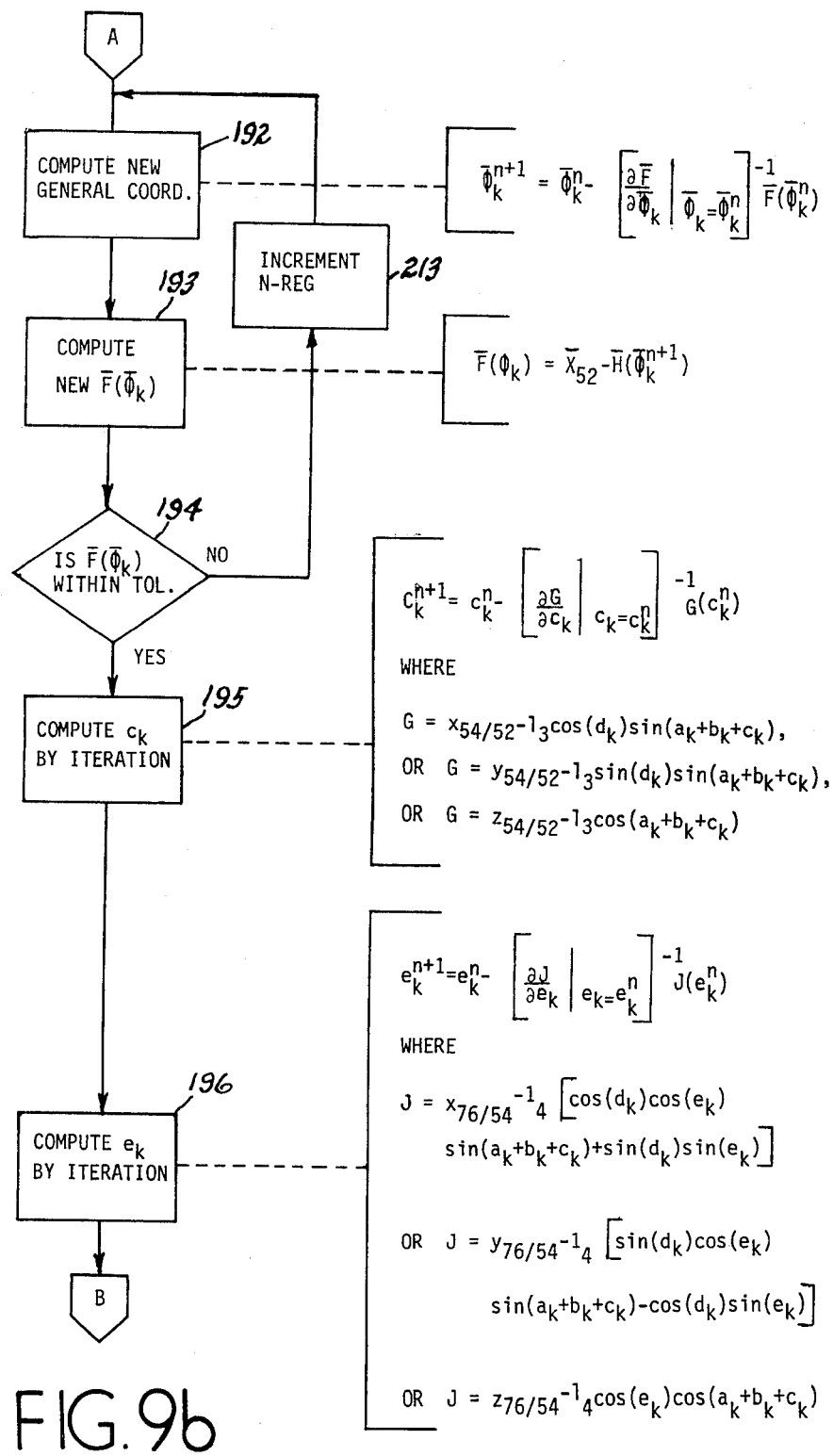
Figure 9C:
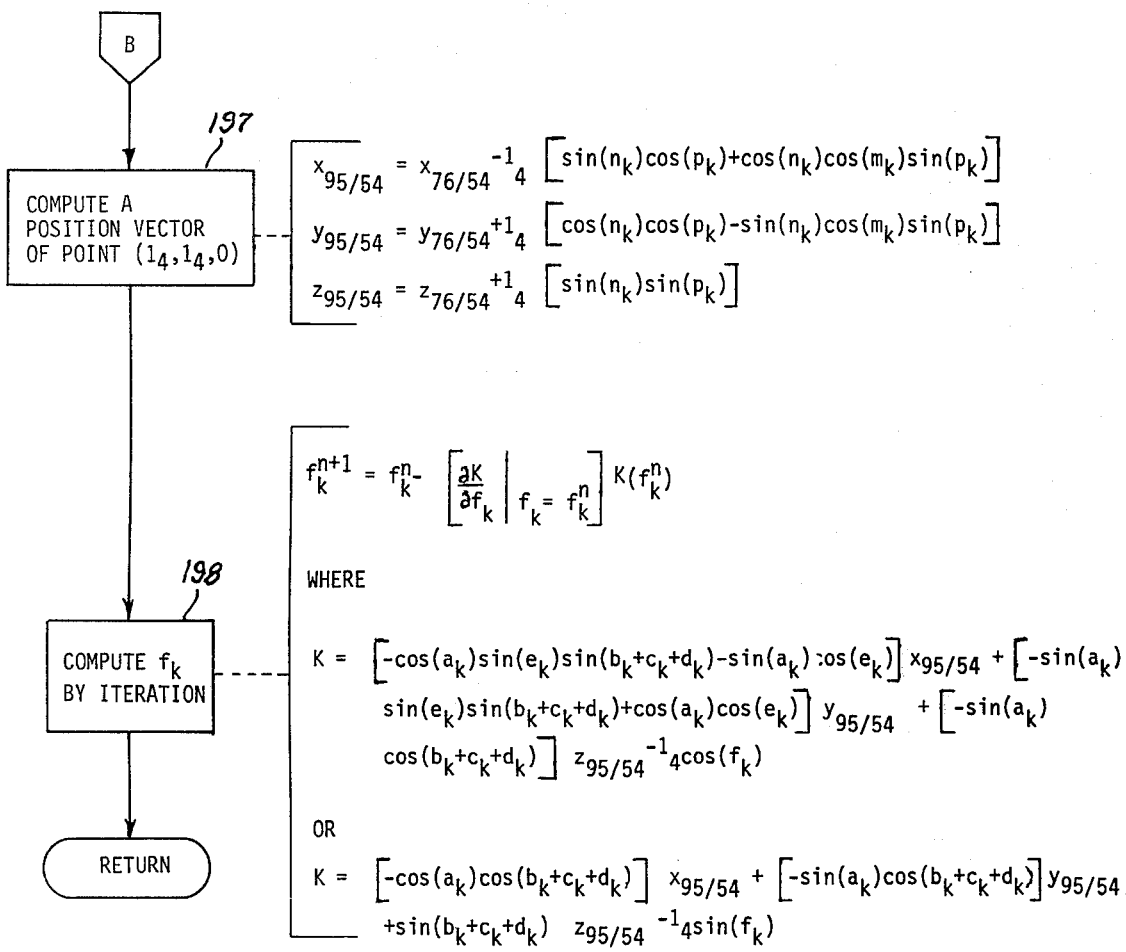

FIG. 9 is a detailed flow chart of a method for transforming the rectangular coordinate value signals to corresponding generalized coordinate value signals. There are several approaches to solve such a problem. The obvious approach is to write equations defining the generalized coordinates in terms of the rectangular and angular coordinates. Given the proper apparatus these equations can be solved; and the transformations executed. Unfortunately, these expressions involve inverse trigonometric functions which are difficult to solve. Therefore, a different and unique approach was chosen. The expressions defining each of the rectangular and angular coordinates in terms of the generalized coordinates were derived. The resulting equations are coupled and nonlinear. These equations are then solved by a method of successive approximations using the general Newton-Raphson method of solving nonlinear equations. It should be remembered that the choice of the Newton-Raphson method of solving the transformation equations is arbitrary, and any convenient method of solving nonlinear equations may be used.

Exclusive of the $p$ and $f$ angles defining roll, the rectangular and generalized coordinate systems are related by a set of transformation equations (1), (2) and (3), and a set of constraint equations (4), (5) and (6) representing orientation constraints on the function element 34, as indicated below:

1. $x = \cos(d) \{ l_1\sin(a)+l_2\sin(a+b)+l_3\sin(a+b+c) \} + l_4\{\cos(d)\cos(e)\sin(a+b+c)-\sin(d)\sin(e)\}$
2. $y = \sin(d) \{ l_1\sin(a)\sin(a)+l_2\sin(a+b)+l_3\sin(a+b+c) \} + l_4\{\sin(d)\cos(e)\sin(a+b+c)+\cos(d)\sin(e)\}$
3. $z = l_1\cos(a)+l_2\cos(a+b)+l_3\cos(a+b+c)+l_4\cos(e)\cos(a+b+c)$ and
4. $l_4\cos(n)\sin(m) = l_4\{\cos(d)\cos(e)\sin(a+b+c)-\sin(d)\sin(e)\}$
5. $l_4\sin(n)\sin(m) = l_4\{\sin(d)\cos(e)\sin(a+b+c)+\cos(e)\sin(e)\}$
6. $l_4\cos(m) = l_4\cos(e) \cos(a+b+c)$ From the above equations one can readily see that there are six equations and five unknowns. The method of solving these equations is somewhat arbitrary; and one technique is described below.

Given the rectangular and angular coordinates $(x_k, y_k, z_k, m_k, n_k)$, if the rectangular coordinates of the point 52 with respect to the origin can be determined, the first two terms of equations (1), (2) and (3), which represent the coordinate transformations of the point 52, can be solved simultaneously to determine the generalized coordinates $a_k$, $b_k$ and $d_k$. Next, using the above solution, the rectangular coordinates of the point 54 with respect to point 52 and the third term of equations (1), (2) and (3), the generalized coordinate $c_k$ may be determined. Finally, using the solutions for the generalized coordinates $a_k$, $b_k$, $c_k$, and $d_k$, and equations (4), (5) and (6), the generalized coordinate $e_k$ may be determined.

It is now possible to compute the sixth generalized coordinate corresponding to roll. First, it is necessary to define the hand as a plane by defining another point 95 (see FIG. 2) on the hand. The point 95 is located at $(l_4, l_4, O)$ relative to the coordinate system of the hand shown in FIG. 3. Then a constraint is imposed that the spatial coordinates of the new point 95 with respect to the point 54 are equal to the generalized coordinates of the point 54. Therefore, sufficient information is obtained to permit the generalized roll angle to be computed.

As indicated in block 187, by substituting the known angular coordinate values $m_k$ and $n_k$ for the values of $m$ and $n$, the coordinates of the point 76 with respect to the point 54 can be determined. Next, as indicated in block 188, the coordinate values of the point 54 are determined. As indicated in block 189, the coordinate values of the point 52 are determined. This is accomplished by subtracting the coordinate values of the point 54 with respect to the point 52 from the coordinate values of the point 54. The rectangular coordinate values of the point 54 with respect to point 52 are determined by multiplying the length of the element $l_3$ between said points by constants representing the direction cosines of said element.

The problem now is how does one solve for the generalized coordinate values in the first two terms of the first three transformation equations. As indicated earlier, although there are several techniques available, applicant has chosen the Newton-Raphson method of solution. As indicated by block 190, applicant has defined new functions, $H_1$, $H_2$, and $H_3$ corresponding to the first two terms of equations (1), (2) and (3), and representing the coordinate transformations of the point 52. Further, an error function is defined representing the difference between the known terms $x_{52}$, $y_{52}$, and $z_{52}$, and the unknown terms $H_1$, $H_2$, and $H_3$. Generally, the first step of the solution is to assume a value for the generalized coordinate values of the unknown terms and then solve the error function. The value of the error function and the assumed generalized coordinate values are used with the Newton-Raphson solution to find a new value for the generalized coordinates. Next, using the new generalized coordinate values, a new error function is computed. If a solution of the new error function is zero, or less than a predetermined tolerance, the calculated values of the generalized coordinates are deemed to be correct. If the value of the new error function is not within tolerance, the Newton-Raphson solution is again used to determine a further set of generalized coordinate values, which, in turn, define a further value for the error function. The process continues until the error function is driven to less than the predetermined tolerance.

As indicated by the annotation to process block 190, applicant has chosen to use the generalized coordinate values of the previous point as the first assumption in solving for the value of the unknown terms in the functions $H_1$, $H_2$, and $H_3$. Next, after setting an indexing register equal to zero as required in process block 191, process block 192 requires a computation of a new set of generalized coordinate values using the error function computed in process block 190.

This process continues until the decision block 194 finds the error function to be within tolerance. When this occurs, the most recently calculated values of generalized coordinate values are defined as the angles $a_k$, $b_k$, and $d_k$ which define the position of the point 52 corresponding to the rectangular coordinate values computed in process block 189. The magnitudes of the angles $a_k$, $b_k$, and $d_k$ represent a first set of generalized coordinate values describing the location of the function element in space.

The process then continues to block 195 where the generalized coordinate $c_k$ is computed. Again, applicant has chosen to use the Newton-Raphson method of solution. Therefore, it is understood that block 195 includes the steps of the Newton-Raphson solution as defined earlier in process blocks 190 and 194. An error function G is defined as the difference between the rectangular coordinate values of the point 54 with respect to the point 52 and the corresponding coordinate transformations represented by the third term of equations (1), (2) and (3). One further point should be noted with regard to this solution. Although there is only one unknown to be determined, three error equations are required. During the iteration process of the Newton-Raphson solution, the sine and cosine values may go to zero; therefore, the computer may be instructed to divide by zero. The problem is eliminated by performing a test on the error functions in order to select an error function whose derivative does not approach infinity.

As indicated in block 196, the generalized coordinate $e_k$ is determined. Again, applicant has chosen to use the Newton-Raphson method of solution; and therefore, it is understood that block 196 includes the general steps of the solution as indicated in process blocks 190 through 194. Further, the error function J represents the difference between the rectangular coordinate values of the point 76 with respect to the point 54 and the corresponding coordinate transformations represented by the last term of equations (1), (2) and (3). As described above, these error functions are tested; and one is chosen which does not have an infinity derivative.

In order to compute the generalized coordinate roll angle $f$, the hand is defined as a plane. This is accomplished as indicated in block 197 by computing a position vector from a point 95 in the plane back to the point 54. This is indicated in FIG. 2 by the point 95 which is located in the $x$, $y$ orientation plane and equidistant from the $x$- and $y$-axes. Further, said distance is equal to the length of the element $1_4$. As indicated by the annotation associated with the block 197, the position of the point 95 with respect to the point 54 is calculated. This permits the generalized coordinate $f_k$ to be solved using the Newton-Rapson method as described earlier. This solution is disclosed in block 198 using the error function K. As described earlier, these error functions are tested; and one is chosen which does not have an infinity derivative. After the values of the generalized coordinates $a_k$, $b_k$, $c_k$, $d_k$, $e_k$ and $f_k$ have been determined, they are stored as the current values to be output to the servo drive circuit and are used as the assumed coordinate values for transforming the next set of calculated rectangular and angular coordinate values.

Figures 10, 11:
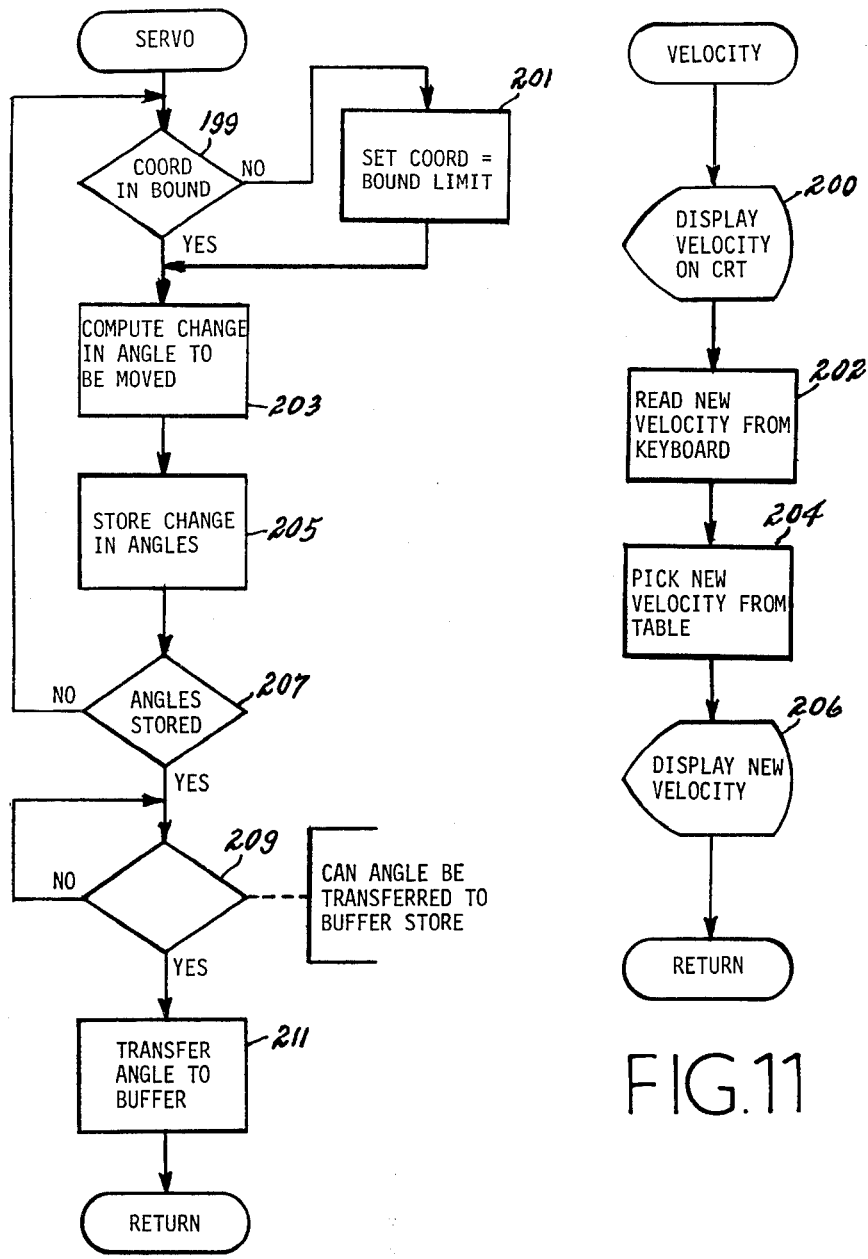
FIG. 10 is a detailed flow chart illustrating a method of generating signals to be output to the servomechanism circuit.
FIG. 11 is a detailed flow chart of a routine for programming a velocity input signal.

In FIG. 10, after the generalized coordinate value signals have been generated as described with reference to FIG. 9, each coordinate value is checked by process block 199 to determine if it exceeds a predetermined maximum or minimum coordinate value. If the coordinate is not within the predetermined boundary, block 201 requires the generalized coordinate value be set equal to the boundary value. Next, according to block 203, the change in the angle of the generalized coordinate is computed. This is accomplished by subtracting the new coordinate value from the previous coordinate value. The change in the generalized coordinate value is then stored as required in block 205. Process block 207 determines if all the new generalized coordinates displacements have been computed and stored. If not, the process returns to block 199 and begins again. After all the generalized coordinate changes have been calculated and stored, block 209 determines if these new values can be transferred to a buffer store. As described in FIG. 7, when an interrupt occurs, data is transferred from the buffer store to the servomechanism drive and interfacing circuit 94; therefore, after an interrupt, process block 211 requires that the change in the generalized coordinate values be transferred to the transfer store.

FIG. 11 illustrates the steps required to generate a velocity signal for a predetermined point. Upon depression of the velocity function key 67 on the keyboard, the block 200 is operative to display the word velocity on the CRT. After the desired numerical velocity value has been entered, block 202 reads this numerical value. Process block 204 compares the desired velocity with a table of allowable velocities and picks the closest value from the table. Process block 206 displays the new velocity magnitude on the CRT, and a velocity signal representing the new velocity magnitude will be entered in the data store in response to the program push button.

FIG. 12 illustrates the process for programming one of a number of predetermined functions associated with the function key 213 shown in FIG. 6. Block 208 displays the word function on the CRT. Next, block 215 reads which function was entered, and block 210 selects the appropriate function. The first function is the wait function, and if entered, the word wait is displayed by block 212. When in the automatic mode, the wait function causes the robot arm operation to stop at an associated point and interrogate a process input signal defined by a numeric code. The robot arm waits until the process input signal is received before proceeding to the next programmed point. After depressing the function key 213, the operator types in an alphabetic code defining the wait function signal. This is followed by a numeric code identifying the process input signal associated with the function. After identifying and displaying the wait function, process block 214 reads the keyboard to determine the identity of the process input signal. The process block 216 determines whether or not the identity of the input signal is acceptable. For example, whether or not the numerical code associated with the function is within the number of process input signals allowed. If the typed in information is unacceptable, block 218 generates an error display. If the information is acceptable, the identity of the associated process input signal is displayed in block 220.

The second predetermined function is the branch function. When in the automatic mode, the branch function causes the robot arm operation to stop; and a branch input signal defined by a numeric code is interrogated. If a branch input signal is present, the robot arm modifies its present path and moves into the first point of the branch. The branch itself constitutes a sequence of operation; and on completion of the sequence, the control of the robot arm is transferred to the program from which the branch occurred. Once again, after depressing the function key, the operator types in an alphabetic code producing the branch function signal followed by a numeric code which produces an input signal identifying the particular branch. The word branch is displayed by process block 217. The code identifying the branch is read from the keyboard by the process block 222. Process block 224 determines whether or not the typed in information is acceptable. If it is not, an error is displayed by process block 226. If the typed in information is acceptable, it is displayed as it was typed in by process block 228.

The next predetermined function is a delay function. When in the automatic mode, the delay function causes the robot arm operation to stop for a period of time determined by a numeric code typed in by the operator. After the period of time, the robot arm proceeds to the next programmed point. Once again, after pressing the function key, the oeprator types in an alphabetic code generating the delay function signal followed by a numeric code which produces an input signal representing the magnitude of the desired delay. Process block 219 displays the word delay. The numeric information defining the delay magnitude is read from the keyboard by process block 230. Process block 234 determines whether or not the delay magnitude is within the predefined limits. If the numeric code defines a time delay exceeding these limits, an error is displayed by the process block 236. If the numeric code defines a time delay within the limits, the magnitude of the time delay is displayed by the process block 238.

The final of the predetermined functions is an output function. When in the automatic mode, the output function causes the robot arm operation to stop; and an output signal is transmitted to the process. This output signal may be pulsed. It may turn on a signal presently turned off, or it may turn off a signal presently turned on. The particular type of output signal is defined by a numeric code. Consequently, after depressing the function key, the operator types in an alphabetic code producing the output function signal followed by a numeric code which produces an input signal identifying the desired output signal. Process block 232 is operative to display the word output. The identity of a particular output signal is read from the keyboard by process block 240. The validity of the information is checked by process block 242. If the information is invalid, an error is displayed by process block 244. Process block 221 reads the numeric information identifying the type output signal desired, and block 223 checks the validity of the said information. If the information checks out to be correct, the output signal and associated status are displayed on the CRT by process block 246.

FIG. 13 represents the steps required to execute the close path function. As discussed earlier, during the automatic mode of operation, a repetitive cycle of the program is executed with the execution of an associated physical process. To achieve this, an input signal must be programmed in association with one of the points to identify the point as a repeat point on which the path of motion is to close, thereby defining the repetitive cycle of the program. In applicant's preferred embodiment, a close path function is used to define the repeat point as the final point of the program. After all of the points have been taught, the operator produces a close path signal by activiating the close path push button 225. Next a code is entered which produces a input signal identifying one of the previously taught points as the repeat point on which the current path of motion is to close. Therefore, during the automatic mode of operation, the end of the robot arm initially moves through the program to the repeat point. Thereafter, the end of the robot arm moves through the repetitive cycle starting and ending with the repeat point and including other points located thereafter in the program. The word close path is displayed on the CRT by the block 248 after which process block 250 reads the keyboard to identify the point on which the path is to close. Process block 252 determines whether or not this is a valid point on which to close the path. For example, a point may be typed in which has not been previously programmed. If this occurs, an error display is generated by block 254. If the point is a valid point, block 256 defines the point as a stop point. This means the robot arm may not operate in a continuous manner through this point. Next, block 258 determines whether or not the path is to close on another branch or on the mainline program. If it is closing on a mainline program, block 260 determines whether or not it is closing from a branch or the mainline program. If the path is closing on a branch, process block 262 determines whether the path is closing on a different branch or on the present branch.

Depending on whether or not the path closure occurs on the same branch, another branch or the mainline program, process blocks 264, 266 and 268 are operative to control the path closing operation. The process block 264 puts a subroutine closing on the same branch. For purposes of this disclosure, a subroutine is defined by a branch that closes on itself, therefore, this routine forces the branch to close on its final point. Block 266 puts a branch closing on another branch, and the block 268 puts a main closing on the mainline program. In each of these cases, the address of the point on which the branches close is put at the end of the branch.

FIG. 14 illustrates the process for programming tool length functions. Depending on the requirements of a particular system design, the numerical value of the tool length may be a direct input to the control. Alternatively, a numeric code may be an input which represents one of a number of the preprogrammed tool length values. After depressing the tool length function key 277, illustrated in FIG. 6, to produce a tool length signal, the operator enters a numeric value representing the desired tool length. The process block 272 displays the word tool length function on the CRT. Process block 274 reads the new tool length code from the keyboard. Process block 276 determines whether or not the new tool length is acceptable. If the length is not acceptable, process block 278 generates an error display. If the tool length data is acceptable, block 280 is operative to display the new tool length. Finally, process block 282 adjusts the stored position coordinate values to correspond to the new tool length data.

FIG. 15 illustrates a process for determining the status of a particular tool. The tool status refers to the type of signal which the control will produce to activate a tool operation. There is a great variety of tools that may be used in conjunction with the robot arm; likewise, there is a great variety of actuators to operate these tools. Generally, the type of actuator depends on the function of the tool. Some tools may only require a signal indicating they are to operate. Whereas other tools may require a sustained signal on an input of their actuator. The disclosed embodiment provides three types of tool actuating signals. They are a pulsed signal, a maintained signal, and a signal that is maintained until a process input signal is received. Therefore, when the operator depresses the tool status push button 229 on the keyboard in FIG. 6 to produce a tool status signal, the word tool status is displayed by the process block 284. Process block 286 reads the code corresponding to the desired tool status. Block 288 determines whether or not the programmed code is acceptable. If an unacceptable code has been programmed, block 290 generates an error display. If the code is acceptable, block 290 will cause the programmed tool status to be displayed.

It should be noted up to this point that the discussion has only encompassed a single tool located in the robot arm. There are several tooling configurations in which more than one tool is simultaneously located in the arm. The present embodiment makes allowances for such an application. A tool selector switch 87 is located on the pendant shown in FIG. 5. When programming a particular point the selector switch can be moved to tool 1 or tool 2 positions, thereby generating the appropriate tool number signals. This causes the control to associate the dimensional and functional data with the selected tool. Although the present disclosure only contemplates the use of two tools, the use of a greater number of tools is well within the spirit and scope of the present disclosure. Therefore, the tool length hand tool status functions disclosed in FIGS. 14 and 15 will be associated with the particular tool which is chosen by the tool selector switch on the pendant.

After the coordinate value signals and input signals representing functional information have been defined, the operator enters this information into the data store by activating the program push button 85 illustrated in FIG. 5. FIG. 16 illustrates the steps required to add information to the data store. In determining the information to be stored, both the CRT and the selector switch 87 must be interrogated. First, process block 328 determines whether or not it is possible to add the information. For example, it determines whether or not there is physically enough room in the memory to accept the data. If it is not possible to add additional information, an error is displayed by process block 328. If it is possible to add information, process block 330 determines whether or not the data is being added sequentially to previously defined points or whether data is being inserted between two previously defined points. If the data is being inserted, successive data is shifted down in the memory. Next, process blocks 332 and 334 retrieve the coordinate value information and the functional information for insertion at the appropriate storage location. Finally, process block 338 is operative to adjust the address pointers.

FIG. 17 illustrates the steps required to delete a point. It should be noted that a point may be deleted by activating a delete function push button 231 on the keyboard illustrated in FIG. 6, or a delete push button 233 located on the pendant shown in FIG. 5. The difference is that the keyboard delete function permits the operator to delete any point in the program, whereas the pendant delete push button is only effective to delete a programmed point defining the present location of the robot arm. When the delete function key 231 is depressed a delete signal is produced; and process block 340 displays the word delete on the CRT. Process block 342 reads the identity of the point to be deleted from the keyboard. If a delete signal is produced by the pendant delete push button, the control looks at the identity of the point at which the robot arm is presently located. Process block 344 determines whether or not the point can be deleted. For example, it must be determined whether or not the point in fact has been programmed, if the point is the first point in a branch etc. If anyone of these conditions exists, an error display is produced by the block 346.

If the point can be deleted, process block 348 determines whether or not the point is referred to more than once in the memory. For example, if the point represents a point of branch closing, then the associated close path function must be deleted also. Process block 350 determines whether to delete one point as required by a mainline close path function or two points as required by a branch close path function. Process block 352 is operative to fill in the empty storage with data located subsequent to the deleted data. Process blocks 354, 356 and 358 perform other housekeeping chores within the computer in accordance with the dynamic allocation of the data area. If the point to be deleted does not represent a point of closure and in fact only occurs once, blocks 360, 362, 364, 366 and 368 are operative to change memory locations and address pointers in response to the deleted point.

FIG. 18 illustrates the process associated with the initialize function. The initialize function may be used to delete a branch program or the mainline program. After pushing the initialize function key 235 to produce an initialize function signal, the operator types in a code to produce an input signal representing the identity of the first point of the branch program or the mainline program he desires to delete. A program can not be initialized if the robot arm is physically located at a point in said program. Consequently, if a branch program is to be initialized, the robot arm must be located either in the mainline program or in another branch. If the mainline program is to be initialized the robot arm must be located at its alignment position. After the initialize push button is activated, the word initialize is displayed on the CRT by process block 306. The identity of the first point of the program to be initialized is read from the keyboard by process block 308. Process block 310 determines whether or not the point programmed is in fact the first point in a program. Next, process block 312 determines whether or not the robot arm is presently located at a point in the program to be initialized. If either of the above conditions are not adequately satisfied, the process block 314 displays an error signal. If all conditions are satisfied, process block 316 determines whether or not a mainline program or a branch program is to be initialized. If a mainline program is to be initialized, process blocks 318 and 320 delete the data in memory and adjust the address pointers. If a branch program is to be initialized, process blocks 322, 324 and 326 delete the data in the particular branch, move the other data to its appropriate locations and adjust the address pointers.

FIG. 19 illustrates the steps required to recall a point from storage and display the data associated with the point on the CRT. The recall function is only for display purposes and does not in any way modify the program. Upon activating the recall push button 237 illustrated in FIG. 6, process block 294 displays the word recall on the CRT. After pushing the recall push button the operator then types in the identity of the point he wishes to recall. Process block 296 reads the identity from the keyboard. Block 298 determines whether or not such a point is available. If the point is unavailable process block 300 generates an error display. If the point is available, process block 302 displays the identity of the point and the functions associated with said point. The previously displayed program information may be restored to the CRT by executing the cancel button 81 shown in FIG. 6, and process block 304 is then active to restore the CRT to its previous display.

FIG. 20 illustrates the steps required to proceed back through a number of predetermined points and replay the program in reverse. In a similar manner, the program may also be replayed in the forward direction in order to check on its operability. The replay reverse and replay forward modes of operation are initiated by a replay reverse push button 239 and a replay forward push button 241 located on the pendant illustrated in FIG. 5. Upon depressing the replay reverse push button, the robot arm will move back through the program to a previously defined point. Robot arm motion will occur as long as the replay reverse push button is activated. Motion stops upon release of the replay reverse push button. Further, the motion stops when a previously defined point is reached. To continue back through the program, the push button must be released and then activated again. In a similar manner, the robot arm may be made to move forward through a program by depressing the replay forward push button. Again, the robot arm moves through the program one point at a time, and the robot arm terminates motion when either the push button is released or a subsequent point is reached. To proceed to the next point, in the forward mode, the push button must be released and then again depressed. After depressing the replay reverse push button, process block 372 determines whether or not the present position of the robot corresponds to the alignment position. Since the alignment position represents the point from which all programs originate, it is impossible to go backward from the alignment position. If the robot is presently located at the alignment position, process block 374 displays an error condition. Otherwise, process block 376 is operative to transfer data from the store in the reverse direction to the servo drive circuit. In addition, process block 378 is operative to display the data associated with the points being output in the reverse direction. After the robot arm is passed backward through the program a desired amount, the program may then be replayed forward by depressing the replay forward push button. Process block 380 sets the replay status to output the program data in the forward direction.

When moving forward through the program it may be desired to execute the functions associated with each of the programmed points. The functions may be executed by depressing the replay function push button 243 located on the pendant illustrated in FIG. 5.

FIG. 21 illustrates the steps required to replay a function. Process block 382 checks to determine whether or not a function can be executed. The function cannot be executed in the replay reverse mode. If the function can be executed, block 384 is operative to initiate the execution of the function. Similarly, the tool 1 push button 247 or the tool 2 push button 249 may be depressed to initiate the operation of tool 1 or tool 2 respectively.

It should be noted that a number of the function push buttons, shown in FIG. 6, have not been discussed. These functions are more of an editing nature after a program has been generated and are not particularly relevant to the actual generation of a program in the first instance. Further, it is deemed that one who is skilled in the art would be able to implement the functions without any undue experimentation. The first function is defined by the modify push button 390. This function permits a point to be identified and the coordinate values of that point modified by a numeric value which is typed into the keyboard. It should be noted that the modification takes place by entering data relative to the rectangular coordinate system. The punch push button 392 is operative to energize a tape punch and transfer the program from the data store to punched tape. A program may be transferred to tape for archival purposes or for use by another robot arm in a similar situation. The read push button 394 is operative to energize a tape reader thereby allowing the data store to be loaded with a program.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the apparatus comprising:

a. means for producing a command signal to command motion of the end of the robot arm along a selected axis relative to the first coordinate system, said commanded motion being independent of the predetermined paths;

b. means responsive to the command signal for producing sets of first signals representing first coordinate values relative to the first coordinate system of successive end points having a locus along the selected axis;
c. means responsive to the sets of first signals for producing sets of individual control signals representing generalized coordinate values of the end points;
d. means responsive to the sets of individual control signals for causing the actuators to move the end of the robot arm to the end points along the selected axis relative to the first coordinate system;
e. means responsive to the end of the robot arm being moved to each of the predetermined points for transferring to the memory a set of first signals defining a set of input signals and representing first coordinate values of the predetermined point; and
f. means for generating and storing in the memory further input signals to identify one of the predetermined points as a repeat point thereby defining the repetitive cycle of the program.

2. An apparatus for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the apparatus comprising:
a. means for producing a command signal to command motion of the end of the robot arm along a selected axis relative to a second coordinate system different from the generalized coordinate system, said commanded motion being independent of the predetermined paths;
b. means responsive to the command signal for producing sets of second signals representing second coordinate values relative to the second coordinate system of successive end points having a locus along the selected axis;
c. means responsive to the sets of second signals for producing sets of first signals representing first coordinate values of the end points relative to the first coordinate system;
d. means responsive to the sets of first signals for producing sets of individual control signals representing generalized coordinate values of the end points;
e. means responsive to the sets of individual control signals for causing the actuators to move the end of the robot arm to the end points along the selected axis relative to the second coordinate system;
f. means responsive to the end of the robot arm being moved to each of the predetermined points for transferring to the memory a set of first signals defining a set of input signals and representing first coordinate values of the predetermined point; and
g. means for generating and storing in the memory further input signals to identify one of the predetermined points as a repeat point thereby defining the repetitive cycle of the program.

3. An apparatus for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the apparatus comprising:
a. means for producing a command signal to command motion of the end of the robot arm along a selected axis relative to a second coordinate system different from the generalized coordinate system, said commanded motion being independent of the predetermined paths;
b. means responsive to the command signal for producing sets of second signals representing second coordinate values relative to the second coordinate system of successive end points having a locus along the selected axis;
c. means responsive to the sets of second signals for producing sets of first signals representing first coordinate values of the end points relative to the first coordinate system;
d. means responsive to the sets of second signals for producing sets of individual control signals representing generalized coordinate values of the end points;
e. means responsive to the sets of individual control signals for causing the actuators to move the end of the robot arm to the end points along the selected axis relative to the second coordinate system;
f. means responsive to the end of the robot arm being moved to each of the predetermined points for transferring to the memory a set of first signals defining a set of input signals and representing first coordinate values of the predetermined point; and
g. means for generating and storing in the memory further input signals to identify one of the predetermined points as a repeat point thereby defining the repetitive cycle of the program.

4. An apparatus for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system defining the positions of and orientations at predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the apparatus comprising:
a. means for producing command signals to command motions of the end of the robot arm along selected axes relative to the first coordinate system, said commanded motions being independent of the predetermined paths;

b. means responsive to the command signals for producing a plurality of sets of first signal representing first coordinate values relative to the first coordinate system defining the positions of and orientations at successive sets of end points having loci along the selected axes;
c. means responsive to the plurality of sets of first signals for producing a plurality of sets of individual control signals representing generalized coordinate values of the sets of end points;
d. means responsive to the plurality of sets of individual control signals for causing the actuators to move the end of the robot arm to the sets of end points along the selected axes relative to the first coordinate system;
e. means responsive to the end of the robot arm being moved to a number of the predetermined points for providing first input signals, each first input signal representing a functional operation of the robot arm at a corresponding predetermined point during the automatic mode;
f. means responsive to the first input signals and the end of the robot arm being moved to each of the predetermined points for transferring to the memory a first input signal and a set of first signals defining second input signals and representing first coordinate values defining the position of and orientation at the predetermined point; and
g. means for generating and storing in the memory further input signals to identify one of the predetermined points as a repeat point, whereby during the automatic mode of operation the end of the robot arm moves through the repetitive cycle comprised of the predetermined paths connecting the repeat point with subsequent predetermined points.

5. An apparatus for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system defining the positions of and orientations at predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the apparatus comprising:
a. means manually initiated for producing command signals to command motions of the end of the robot arm along selected axes relative to a second coordinate system different from the generalized coordinate system, said commanded motions being independent of the predetermined paths;
b. means responsive to the command signals for producing a plurality of sets of second signals representing second coordinate values relative to the second coordinate system defining the positions of and orientations at successive sets of end points having loci along the selected axes;
c. means responsive to the plurality of sets of second signals for producing a plurality of sets of first signals representing first coordinate values defining the positions of and orientations at the end points relative to the first coordinate system;
d. means responsive to the plurality of sets of first signals for producing a plurality of sets of individual control signals representing generalized coordinate values of the sets of end points;
e. means responsive to the plurality of sets of individual control signals for causing the actuators to move the end of the robot arm to the sets of end points along the selected axes relative to the second coordinate system;
f. manually initiated means responsive to the end of the robot arm being moved to a number of the predetermined points for providing first input signals, each first input signal representing a functional operation of the robot arm at a corresponding predetermined point during the automatic mode;
g. manually initiated means responsive to the first input signals and the end of the robot arm being moved to each of the predetermined points for storing in the memory a first input signal and a set of first signals defining second input signals and representing first coordinate values defining the position of and orientation at the predetermined point; and
h. means manually initiated for generating and storing in the memory further input signals to identify one of the predetermined points as a repeat point, whereby during the automatic mode of operation the end of the robot arm moves through the repetitive cycle comprised of the predetermined paths connecting the repeat point with subsequent predetermined points.

6. An apparatus for generating a program for a robot arm operated by a controller having a memory thereby integrating said robot arm into a physical process by executing a repetitive cycle of the program in an automatic mode of operation during the execution of said process, said program being comprised in part of input signals representing rectangular coordinate values relative to a rectangular coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system, the apparatus comprising:
a. manually initiated means for selectively providing
   1. a rectangular coordinate command signal to command motion of the end of the robot arm along a selected rectangular axis relative to the rectangular coordinate system, and
   2. a cylindrical coordinate command signal to command motion of the end of the robot arm along a selected cylindrical axis of a cylindrical coordinate system different from the generalized coordinate system, said commanded motions being independent of the predetermined paths;
b. means responsive to the cylindrical coordinate command signal for generating sets of second signals representing cylindrical coordinate values of successive first end points having a locus along the selected cylindrical axis;
c. means responsive to the providing means and the generating means for producing 1. in response to the rectangular coordinate command signal, sets of first signals representing rectangular coordinate values relative to the rectangular coordinate system of successive second end points having a locus along the selected rectangular axis, and
2. in response to the sets of second signals, sets of first signals representing rectangular coordinate values of the first end points;

d. means responsive to the sets of first signals for providing sets of individual control signals representing generalized coordinate values of the end points;
e. means responsive to the sets of individual control signals for causing the actuators to move the end of the robot arm to the end points along the selected axis relative to the selected coordinate system;
f. manuall initiated means responsive to the end of the robot arm being moved to a number of the predetermined points for producing first input signals, each first input signal representing a functional operation of the robot arm at a cooresponding predetermined point during the automatic mode;
g. manually initiated means responsive to the first input signals and the end of the robot arm being moved to each of the predetermined points for loading the memory with a first input signal and a set of first signals defining second input signals and representing the rectangular coordinate values of the predetermined point; and
h. manually initiated means for producing and storing in the memory further input signals to identify one of the predetermined points as a repeat point, whereby during the automatic mode of operation the end of the robot arm moves through the repetitive cycle comprised of the predetermined paths connecting the repeat point with subsequent predetermined points.

7. An apparatus for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the apparatus comprising:
a. manually initiated means for producing a command signal to command motion of the end of the robot arm along a selected axis relative to a teaching coordinate system different from the generalized coordinate system, said commanded motion being independent of the predetermined paths;
b. means responsive to the command signal for producing sets of first signals representing first coordinate values relative to the first coordinate system of successive end points having a locus along the selected axis of the teaching coordinate system;
c. means responsive to the sets of first signals for producing sets of individual control signals representing generalized coordinates of the end points;
d. means responsive to the sets of individual control signals for causing the actuators to move the end of the robot arm to the end points along the selected axis relative to the teaching coordinate system;
e. manually initiated means responsive to the end of the robot arm being moved to a number of predetermined points for providing first input signals, each first input signal representing a functional operation of the robot arm at a corresponding predetermined point during the automatic mode;
f. manually initiated means responsive to the first input signals and the end of the robot arm being moved to each of the predetermined points for storing in the memory a first input signal and a set of first signals defining second input signals and representing first coordinate values of the predetermined point; and
g. manually initiated means for generating and storing in the memory further input signals to identify one of the predetermined points as a repeat point, whereby during the automatic mode of operation the end of the robot arm moves through the repetitive cycle comprised of the predetermined paths connecting the repeat point with the subsequent predetermined points.

8. The apparatus of claim 7 wherein the means for providing first input signals further comprises means for producing a velocity signal representing the speed at which the end of the robot arm will move to the predetermined point during the automatic mode.

9. The apparatus of claim 7 wherein said means for providing first input signals further comprises:
a. means for producing a delay function signal to stop the end of the robot arm during the automatic mode at the predetermined point for a predetermined period of time; and
b. means responsive to the delay function signal for producing a timing signal representing said predetermined period of time.

10. The apparatus of claim 7 wherein the means for providing first input signals further comprises:
a. means for producing a wait function signal to stop the end of the robot arm during the automatic mode at the predetermined point and to subsequently initiate robot arm motion in response to a process signal generated during the execution of the physical process; and
b. means responsive to the wait function signal for producing a first signal to identify said process signal.

11. The apparatus of claim 7 wherein the means for providing first input signals further comprises:
a. means for producing an output function signal to stop the end of the robot arm during the automatic mode at the predetermined point and to subsequently initiate robot arm motion after transmitting an output signal to the physical process; and
b. means responsive to the output function signal for producing a second signal to identify said output signal.

12. The apparatus of claim 7 wherein the means for providing first input signals further comprises:
a. means for producing for the predetermined point a branch function signal to cause the end of the robot arm during the automatic mode to move through a sequence of points comprising the branch and thereafter to proceed to another of the predetermined points; and b. means responsive to the branch function signal for producing a third signal to identify the branch.

13. The apparatus of claim 12 wherein the means for providing first input signals further comprises:
   a. means for producing for a predetermined point an initialize function signal to delete a predetermined sequence of previously programmed points; and
   b. means responsive to the initialize function signal for producing a fourth signal to identify the predetermined sequence of previously programmed points to be deleted.

14. The apparatus of claim 7 wherein the end of the robot arm has a plurality of tools simultaneously secured thereto and the means for providing first input signals further comprises means for producing for the predetermined point a tool number signal to select one of the plurality of tools located on the robot arm to be effective during the automatic mode.

15. The apparatus of claim 14 wherein the means for providing first input signals further comprises means for producing a tool length signal representing the length of the one of the tools.

16. The apparatus of claim 7 wherein said apparatus further comprises manual means for deleting from the memory the input signals associated with the predetermined point at which the end of the robot arm is located.

17. The apparatus of claim 7 wherein the apparatus further comprises:
   a. means for producing a delete signal;
   b. means responsive to the delete signal for producing a fifth signal identifying a previously programmed point; and
   c. means responsive to the delete signal and the fifth signal for deleting from the memory the input signals and the coordinate value signals associated with the previously programmed point defined by the fifth signal.

18. The apparatus of claim 7 wherein said apparatus further comprises:
   a. means for producing a modify signal;
   b. means for recalling from the memory coordinate value signals corresponding to a predetermined point;
   c. means for producing a correction signal representing sign and magnitude of a correction to the coordinate value signals;
   d. means for adding the coordinate value signals to the correction signal to produce a new coordinate value signal; and
   e. means for storing the new coordinate value signals in the memory.

19. The apparatus of claim 7 wherein said apparatus further comprises means for causing the robot arm to move to a second predetermined point immediately preceding the predetermined point corresponding to the present location of the robot arm.

20. The apparatus of claim 19 wherein the apparatus further comprises means for causing the robot arm to move from the second predetermined point to the predetermined point.

21. The apparatus of claim 7, wherein the means for producing a command signal further comprises means for producing a first command signal to initiate a change in the position of the end of the robot arm along a selected axis relative to a rectangular coordinate system.

22. The apparatus of claim 21, wherein the means for producing sets of first signals further comprises means responsive to the first command signal for producing sets of first signals representing rectangular coordinate values of successive end points having a locus along the selected axis of the rectangular coordinate system.

23. The apparatus of claim 7, wherein the means for producing a command signal further comprises means for producing a second command signal to initiate a change in the position of the end of the robot arm along a selected axis relative to a cylindrical coordinate system.

24. The apparatus of claim 23, wherein the means for producing sets of first signals further comprises:
   a. means responsive to the second command signal for generating sets of second signals representing cylindrical coordinate values of successive end points having a locus along the selected axis of the cylindrical coordinate system; and
   b. means responsive to the sets of second signals for producing sets of first signals representing rectangular coordinate values of the end points.

25. A method for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connecting by predetermined paths generated during the automatic mode, said robot arm having a plurality of actuators with at least one of said actuators defining an axis of rotation affecting the position of an end of the robot arm, and said robot arm having a geometric configuration defining a generalized coordinate system independent of said first coordinate system, the method comprising the steps of:
   a. producing a command signal to command motion of the end of the robot arm along a selected axis relative to the first coordinate system, said commanded motion being independent of the predetermined paths;
   b. producing, in response to the command signal, a set of first signals representing first coordinate values relative to the first coordinate system of an end point lying along the selected axis;
   c. producing, in response to the set of first signals, a set of individual control signals representing generalized coordinate values of the end point;
   d. driving the actuators in response to the set of individual control signals to move the end of the robot arm along the selected axis to the end point;
   e. iterating steps (a) through (d) to cause the end of the robot arm to move to a predetermined point;
   f. storing in the memory input signals corresponding to a set of first signals representing first coordinate values of the predetermined point;
   g. iterating steps (a) through (f) to cause input signals to be stored for each of the predetermined points;
   h. producing further input signals to identify one of the predetermined points as a repeat point thereby defining the repetitive cycle of the program; and
   i. storing the further input signals in the memory.

26. A method for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connected by predetermined paths generated during the automatic mode, said robot arm having a plurality of actuators with at least one of said actuators defining an axis of rotation affecting the position of an end of the robot arm, and said robot arm having a geometric configuration defining a generalized coordinate system independent of said first coordinate system, the method comprising the steps of:

a. producing a command signal to command motion of the end of the robot arm along a selected axis relative to a second coordinate system different from the generalized coordinate system, said commanded motion being independent of the predetermined paths;

b. producing, in response to the command signal, a set of second signals representing second coordinate values relative to the second coordinate system of an end point coincident with the selected axis;

c. producing, in response to the set of second signals, a set of first signals representing first coordinate values of the end point relative to the first coordinate system;

d. producing, in response to the set of first signals, a set of individual control signals representing generalized coordinate values of the end point;

e. driving the actuators in response to the set of individual control signals to move the end of the robot arm to the end point along the selected axis relative to the second coordinate system;

f. iterating steps (a) through to cause the end of the robot arm to move to a predetermined point;

g. storing a set of first signals defining the input signals and representing the first coordinate values of the predetermined point;

h. iterating steps (a) through (g) to store a set of input signals for each of the predetermined points in the program;

i. producing further input signals to identify one of the predetermined points as a repeat point thereby defining the repetitive cycle of the program; and j. storing the further input signals in the memory.

27. A method for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system defining the positions of and orientations at predetermined points being connected by predetermined paths generated during the automatic mode, said robot arm having a plurality of actuators with at least one of said actuators defining an axis of rotation affecting the position of an end of the robot arm, and said robot arm having a geometric configuration defining a generalized coordinate system independent of said first coordinate system, the method comprising the steps of:

a. producing a command signal to command motion of the end of the robot arm along a selected axis relative to the first coordinate system, said commanded motion being independent of the predetermined paths;

b. producing, in response to the command signal, sets of first signals representing first coordinate values relative to the first coordinate system defining the position of and orientation at an end point lying along the selected axis;

c. producing, in response to the set of first signals, a set of individual control signals representing generalized coordinate values of the end point;

d. activating the actuators in response to the set of individual control signals to move the end of the robot arm to the end point along the selected axis relative to the first coordinate system;

e. iterating steps (a) through (d) to cause the end of the robot arm to move to a position of and orientation at a predetermined point;

f. storing in the memory a set of first signals defining first input signals and representing first coordinate values defining the position of and orientation at the predetermined point;

g. providing a second input signal representing a functional operation of the robot arm to be executed at the predetermined point during the automatic mode of operation;

h. storing the second input signal;

i. iterating steps (a) through (h) to store input signals representing the position of and orientation at each of the predetermined points and the functions associated therewith;

j. producing further input signals to identify at one of the predetermined points as a repeat point; and k. storing the further input signals in the memory, whereby during the automatic mode of operation the end of the robot arm moves through the repetitive cycle comprised of the predetermined paths connecting the repeat point with subsequent predetermined points.

28. A method for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system defining the positions of and orientations at predetermined points being connected by predetermined paths generated during the automatic mode, said robot arm having a plurality of actuators with at least one of said actuators defining an axis of rotation affecting the position of an end of the robot arm, and said robot arm having a geometric configuration defining a generalized coordinate system independent of said first coordinate system, the method comprising the steps of:

a. producing a command signal to command motion of the end of the robot arm along a selected axis relative to a second coordinate system different from the generalized coordinate system, said commanded motion being independent of the predetermined paths;

b. producing, in response to the command signal, a set of second signals representing second coordinate values relative to the second coordinate system defining the position of and orientation at an end point lying along the selected axis;

c. producing, in response to the set of second signals, a set of first signals representing first coordinate values of the end point relative to the first coordinate system;
d. producing, in response to the set of second signals, a set of individual control signals representing generalized coordinate values of the end point;
e. driving the actuators in response to the set of individual control signals to move the end of the robot arm along the selected axis to the end point;
f. iterating steps (a) through (e) to cause the end of the robot arm to move to a position of and orientation at a predetermined point;
g. producing second input signals representing a functional operation of the robot arm at the predetermined point during the automatic mode of operation;
h. storing in the memory a set of second input signals and a set of first input signals corresponding to a set of first signals representing the first coordinate values defining the position of and orientation at the predetermined point;
i. iterating steps (a) through (h) for each of the predetermined points;
j. producing further input signals to identify one of the predetermined points as a repeat point; and
k. storing the further input signals in the memory, whereby during the automatic mode of operation, the end of the robot arm moves through the repetitive cycle comprised of the predetermined paths connecting the repeat point with subsequent predetermined points.

29. A method for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system defining the positions of and orientations at predetermined points being connected by predetermined paths generated during the automatic mode, said robot arm having a plurality of actuators with at least one of said actuators defining an axis of rotation affecting the position of an end of the robot arm, and said robot arm having a geometric configuration defining a generalized coordinate system independent of said first coordinate system, the method comprising the steps of:
a. producing a command signal to command motion of the end of the robot arm along a selected axis relative to a second coordinate system different from the generalized coordinate system, said command motion being independent of the predetermined paths;
b. producing, in response to the command signal, a set of second signals representing second coordinate values relative to the second coordinate system defining the position of and orientation at an end point lying along the selected axis;
c. producing, in response to the set of second signals, a set of first signals representing first coordinate values of the end point relative to the first coordinate system;
d. producing, in response to the set of first signals, a set of individual control signals representing generalized coordinate values of the end point;
e. driving the actuators in response to the set of individual control signals to move the end of the robot arm along the selected axis to the end point;
f. iterating steps (a) through (e) to cause the end of the robot arm to move to a position of and orientation at a predetermined point;
g. storing in the memory a set of first input signals corresponding to a set of first signals representing the first coordinate values defining the position of and orientation at the predetermined point;
h. producing second input signals representing a functional operation of the robot arm at the predetermined point during the automatic mode of operation;
i. storing the second input signals;
j. iterating steps (a) through (i) for each of the predetermined points;
k. producing further input signals to identify one of the predetermined points as a repeat point; and
l. storing the further input signals in the memory, whereby during the automatic mode of operation, the end of the robot arm moves through the repetitive cycle comprised of the predetermined paths connecting the repeat point with subsequent predetermined points.

30. A method for generating a program for a robot arm operated by a controller having a memory thereby integrating said robot arm into a physical process by executing a repetitive cycle of the program in an automatic mode of operation during the execution of said process, said program being comprised in part of input signals representing rectangular coordinate values relative to a rectangular coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said rectangular coordinate system, the apparatus comprising:
a. selectively producing a rectangular coordinate teaching signal and a cylindrical coordinate teaching signal;
b. producing
 1. in response to the rectangular coordinate teaching signal, a rectangular coordinate command signal to command motion of the end of the robot arm along a selected rectangular axis relative to the rectangular coordinate system, and
 2. in response to the cylindrical coordinate teaching signal, a cylindrical coordinate command signal to command motion of the end of the robot arm along a selected cylindrical axis relative to a cylindrical coordinate system different from the generalized coordinate system,
said commanded motions being independent of the predetermined paths;
c. generating, in response to the cylindrical coordinate command signal, a set of second signals representing cylindrical coordinate values of a first end point lying along the selected cylindrical axis;
d. producing
 1. in response to the rectangular coordinte command signal, a set of first signals representing rectangular coordinate values of a second end point lying along the selected rectangular axis, and
 2. in response to the set of second signals, a set of first signals representing rectangular coordinate values of the first end point;
e. producing, in response to a set of first signals, a set of individual control signals representing generalized coordinate values of an end point along a selected axis of a selected coordinate system;
f. driving the actuators in response to the set of individual control signals to move the end of the robot arm along the selected axis to the end point;
g. iterating steps (a) through (f) to cause the end of the robot arm to move to a predetermined point;
h. storing in the memory a set of first signals defining first input signals and representing rectangular coordinate values of the predetermined point;
i. providing second input signals representing a functional operation of the robot arm at the predetermined point during the automatic mode of operation;
j. storing the second input signals in the memory;
k. iterating steps (a) through (j) to store input signals for each of the predetermined points;
l. producing further input signals to identify one of the predetermined points as a repeat point; and
m. storing the further input signals in the memory, whereby during the automatic mode of operation the end of the robot arm moves through the repetitive cycle comprised of the predetermined paths connecting the repeat point with subsequent points.

31. A method for generating a program for a robot arm operated by a controller having a memory thereby integrating said robot arm into a physical process by executing a repetitive cycle of the program in an automatic mode of operation during the execution of said process, said program being comprised in part of input signals representing first coordinate values relative to a first coordinate system of predetermined points being connected by predetermined paths generated during the automatic mode of operation, said robot arm having a plurality of actuators with at least one of said actuators defining an axis of rotation affecting the position of an end of the robot arm, and said robot arm having a geometric configuration defining a generalized coordinate system independent of said first coordinate system, the method comprising the steps of:
a. producing a command signal to command motion of the end of the robot arm along a selected axis relative to a teaching coordinate system independent of the generalized coordinate system, said commanded motion being independent of the predetermined path;
b. producing in response to the command signal a set of first signals representing first coordinate values of the first coordinate system of an end point lying along the selected axis;
c. producing in response to the set of first signals a set of individual control signals representing generalized coordinate values of the end point;
d. driving the actuators in response to the set of individual control signals to move the end of the robot arm to the end point along the selected axis relative to the teaching coordinate system;
e. iterating steps (a) through (d) to cause the end of the robot arm to move to a predetermined point;
f. providing first input signals representing a functional operation of the robot arm at the predetermined point during the automatic mode of operation;
g. storing in the memory the first input signals and second input signals corresponding to a set of first signals representing first coordinate values of the predetermined point;
h. iterating steps (a) through (g) to store a set of input signals for each of the predetermined points;
i. producing further input signals to identify one of the predetermined points as a repeat point; and
j. storing the further input signals whereby during the automatic mode of operation the end of the robot arm moves through the repetitive cycle comprised of the predetermined paths connecting the repeat point with subsequent predetermined points.

32. The method of claim 31, wherein the step of providing first input signals further comprises the step of providing a velocity signal representing the speed of the robot arm in moving to the predetermined point during the automatic mode.

33. The method of claim 31, wherein the step of providing first input signals further comprises the steps of:
a. producing a delay function signal to stop the end of the robot arm during the automatic mode at the predetermined point for a predetermined period of time; and
b. producing in response to the delay function signal a timing signal representing the predetermined period of time.

34. The method of claim 31, wherein the step of providing first input signals further comprises the steps of:
a. producing a wait function signal to stop the end of the robot arm during the automatic mode at the predetermined point and to subsequently initiate robot arm motion in response to a process signal being generated during the execution of the physical process; and
b. producing in response to the wait function signal a first signal to identify said process signal.

35. The method of claim 31, wherein the step of providing first input signals further comprises the steps of:
a. producing an output function signal to stop the end of the robot arm during the automatic mode at the predetermined point and to subsequently initiate robot arm motion after transmitting an output signal to the physical process; and
b. producing in response to the output function signal a second signal to identify said output signal.

36. The method of claim 31, wherein the step of providing first input signals further comprises the steps of:
a. producing for the predetermined point a branch function signal to cause the end of the robot arm during the automatic mode to move through a sequence of points comprising the branch and thereafter proceed to one of the predetermined points; and
b. producing in response to the branch function signal, a third signal identifying the branch.

37. The method of claim 31, wherein the step of providing first input signals further comprises the steps of:
a. producing for a predetermined point an initialize function signal to delete a predetermined sequence of previously programmed points; and
b. producing in response to the initialize function signal a fourth signal to identify the predetermined sequence of previously programmed points to be deleted.

38. The method of claim 31, wherein the end of the robot arm has a tool secured thereto and the step of providing first input signals further comprises the step of producing a tool length signal representing the length of the tool.

39. The method of claim 31, wherein the end of the robot arm has a plurality of tools secured thereto and the step of providing first input signals further comprises the step of producing for the predetermined point a tool number signal to select one of the plurality of tools located on the robot arm to be effective during the automatic mode.

40. The method of claim 31, wherein the step of providing first input signals further comprises the step of providing a signal to delete from the memory the input signals and the coordinate value signals associated with the predetermined point at which the end of the robot arm is located.

41. The method of claim 31, wherein the step of providing first input signals further comprises the steps of:
   a. producing a delete signal;
   b. producing in response to the delete signal a fifth signal identifying a previously programmed point to be deleted; and
   c. deleting from the memory in response to the delete signal and fifth signal the input signals and the coordinate value signals associated with the previously programmed point defined by the fifth signal.

42. The method of claim 31, wherein the step of producing a command signal further comprises the step of producing a first command signal to initiate motion of the end of the robot arm along a selected axis relative to a rectangular coordinate system.

43. The method of claim 42, wherein the step of producing a set of first signals further comprises the step of producing a set of first signals representing rectangular coordinate values of an end point along the selected axis relative to the rectangular coordinate system.

44. The method of claim 31, wherein the step of producing a command signal further comprises the step of producing a second command signal to initiate motion of the end of the robot arm along a selected axis relative to a cylindrical coordinate system.

45. The method of claim 44, wherein the step of producing a set of first signals further comprises the steps of:
   a. producing in response to the second command signal a set of second signals representing cylindrical coordinate values of an end point lying along the selected axis relative to the cylindrical coordinate system; and
   b. producing in response to the set of second signals a set of first signals representing rectangular coordinate values of the end point along the selected axis relative to the cylindrical coordinate system.

* * * * *